(12) United States Patent
Cao et al.

(10) Patent No.: US 10,215,978 B2
(45) Date of Patent: Feb. 26, 2019

(54) EYEPIECE OPTICAL SYSTEM WITH LARGE FIELD-OF-VIEW ANGLE AND HEAD-MOUNTED DISPLAY APPARATUS

(71) Applicant: Shenzhen NED Optics Co., Ltd., Shenzhen, Guangdong (CN)

(72) Inventors: Hongpeng Cao, Guangdong (CN); Huajun Peng, Guangdong (CN)

(73) Assignee: SHENZHEN NED OPTICS CO., LTD., Shenzhen (CN)

( * ) Notice: Subject to any disclaimer, the term of this patent is extended or adjusted under 35 U.S.C. 154(b) by 56 days.

(21) Appl. No.: 15/544,878

(22) PCT Filed: Nov. 13, 2015

(86) PCT No.: PCT/CN2015/094620
§ 371 (c)(1),
(2) Date: Jul. 19, 2017

(87) PCT Pub. No.: WO2017/079985
PCT Pub. Date: May 18, 2017

(65) Prior Publication Data
US 2017/0371147 A1 Dec. 28, 2017

(51) Int. Cl.
*G02B 25/00* (2006.01)
*G02B 25/04* (2006.01)
*G02B 13/00* (2006.01)
*G02B 27/01* (2006.01)

(52) U.S. Cl.
CPC ............ *G02B 25/04* (2013.01); *G02B 13/002* (2013.01); *G02B 27/0172* (2013.01)

(58) Field of Classification Search
CPC ...... G02B 25/001; G02B 13/004; G02B 9/12; G02B 9/34; G02B 13/04; G02B 25/04; G02B 13/002; G02B 27/0172
USPC ........ 359/644, 645, 715, 716, 753, 771, 784
See application file for complete search history.

(56) References Cited

U.S. PATENT DOCUMENTS

| 5,059,004 A | * | 10/1991 | Matsumura | ........ G02B 23/2453 359/646 |
| 5,815,317 A | | 9/1998 | Omura | |
| 5,877,900 A | | 3/1999 | Omura | |
| 7,978,417 B2 | | 7/2011 | Nishio et al. | |

(Continued)

FOREIGN PATENT DOCUMENTS

| CN | 101609208 B | 4/2011 |
| CN | 101887166 B | 7/2012 |

(Continued)

*Primary Examiner* — William Choi

(57) ABSTRACT

Disclosed is an eyepiece optical system with a large field-of-view angle, and a head-mounted display apparatus. The eyepiece optical system comprises a first lens group (G1) and a second lens group (G2) which are arranged coaxially and successively along an optical axis from a human eye to an image source and meet a certain focal length relationship. A distance (D12) between the first lens (L1) and the second lens (L2), a focal length relationship of lenses within the second lens group (G2) and the material properties of various lenses meet a certain relationship. The eyepiece optical system has the advantages of large aperture, large field-of-view, high resolution, low distortion, and small size, etc., and is suitable for a head-mounted display and similar apparatuses.

23 Claims, 21 Drawing Sheets

(56) References Cited

U.S. PATENT DOCUMENTS

| | | |
|---|---|---|
| 8,345,139 B2 | 1/2013 | Miyazawa et al. |
| 2014/0218806 A1 | 8/2014 | Ishizuka |

FOREIGN PATENT DOCUMENTS

| | | |
|---|---|---|
| CN | 103217782 A | 7/2013 |
| CN | 103988111 A | 8/2014 |
| CN | 104536130 A | 4/2015 |
| CN | 104570323 A | 4/2015 |
| CN | 104603669 A | 5/2015 |
| CN | 104635333 A | 5/2015 |
| CN | 104685402 A | 6/2015 |
| CN | 104730706 A | 6/2015 |
| CN | 104965306 A | 10/2015 |

\* cited by examiner

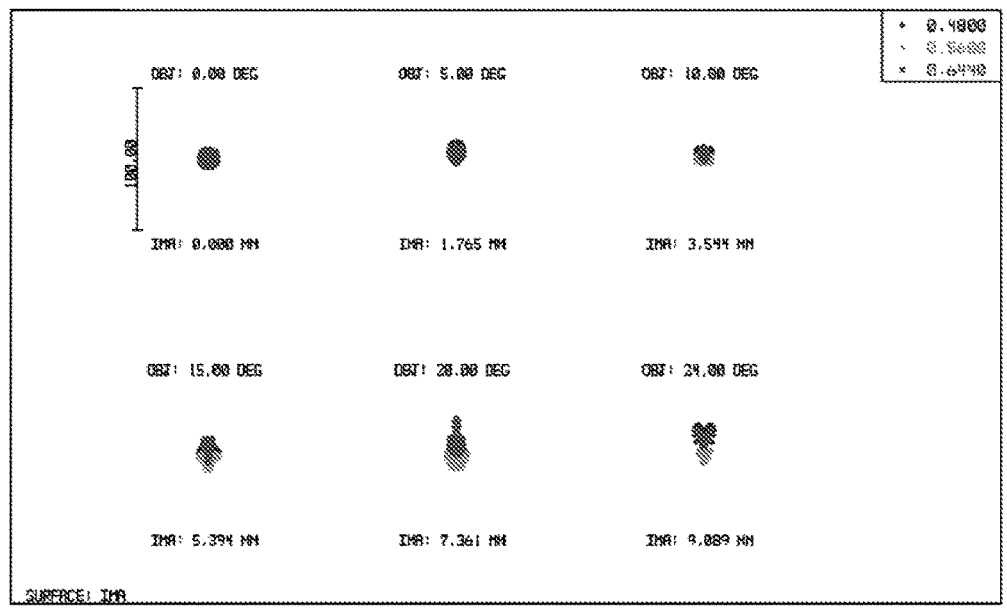
Fig.11
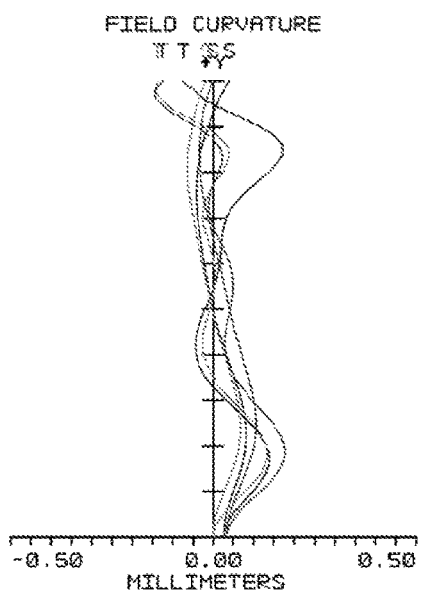
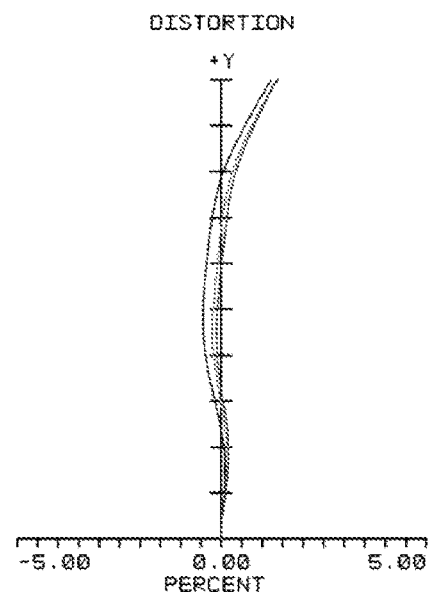
Fig.12(a)　　　　　　　　　　Fig.12(b)

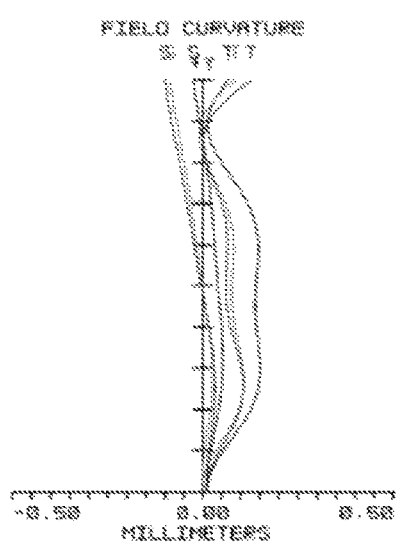
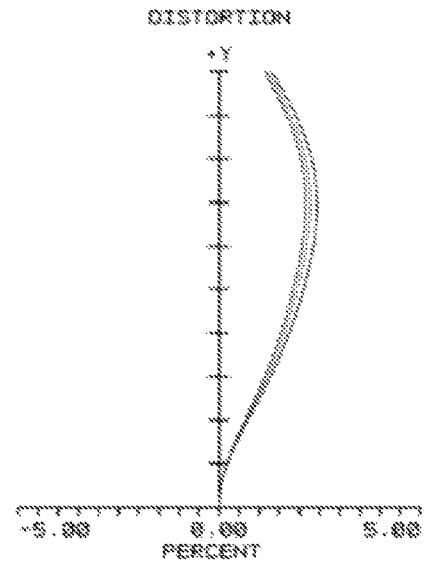
Fig.25(a)  Fig.25(b)
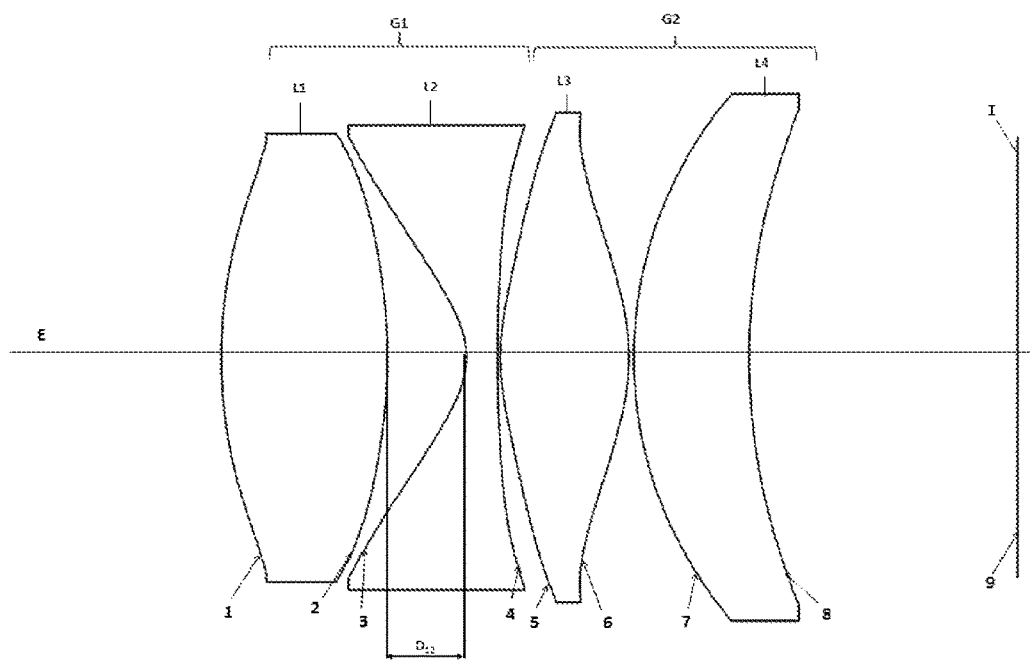
Fig.26

EYEPIECE OPTICAL SYSTEM WITH LARGE FIELD-OF-VIEW ANGLE AND HEAD-MOUNTED DISPLAY APPARATUS

TECHNICAL FIELD

The present disclosure relates generally to the technical field of optical technology, and more particularly, to an eyepiece optical system with a large field-of-view angle and a head-mounted display apparatus.

BACKGROUND

With the continuous development of electronic apparatuses towards super micromation, as well as the development of new computer, microelectronics, optoelectronics and communication theory and technology, the new wearable computing model of the concept that computing should fit human and contribute to the combination between human and machine has become possible. Wearable computing applications emerge in fields of military, industrial, medical, education, consumption and so on. In a typical wearable computing system architecture, the head-mounted display apparatus is a key component, which directs video image light emitted by the miniature image display apparatus (e.g. transmissive or reflective liquid crystal display, organic electroluminescent apparatuses, DMD apparatuses) to the user's pupil via the optical technology, and forms virtual and magnifying images in the near eye range and provides the user with intuitive and visual image, video and text information. The eyepiece optical system is the core of the head-mounted display apparatus, which can display virtual and magnifying images of micro images in front of the user's eyes.

The head-mounted display apparatus of compact size, light weight, convenient wearing and lighten load and so on is the development trend. Meanwhile, a large field-of-view angle determining the highly immersive visual experience and a comfort degree of the visual experience determined by the high image quality and low distortion, have constituted the key factors for evaluating the quality of the head-mounted display apparatus. In order to satisfy these requirements, the eyepiece optical system should meet the indices of the large field-of-view angle, high image resolution, low distortion, small field curvature, small volume and so on as far as possible, while meeting the above optical performances at the same time is a great challenge for the system design and aberration optimization.

The common eyepiece optical system is formed by a three-coaxial-lens assembly constituted by a first lens having a positive focus, a second lens having a negative focus and a third lens having a positive focus. Many prior documents have provided their own designs based on such structure. Patent literatures, such as reference document 1 (Publication No. CN101887166B), reference document 2 (Publication No. CN103217782A), reference document 3 (Publication No. CN104730706A), reference document 4 (Publication No. CN103988111A), reference document 5 (Publication No. CN104685402A), reference document 6 (Publication No. CN104603669A), reference document 7 (Publication No. U.S. Pat. No. 7,978,417B2), reference document 8 (Publication No. U.S. Pat. No. 8,345,139B2), have respectively provided eyepiece optical systems formed by three coaxial lenses having a positive focus, a negative focus and a positive focus, which eyepiece optical systems have low distortion (<3%) and high image quality. But these eyepiece optical systems have small effective viewing angles ranging from 16~37 degrees, respectively, and fail to obtain a large field-of-view angle effect.

Reference document 9 (Publication No. U.S. Pat. No. 5,815,317A) has provided a head-mounted display apparatus composed of a singlet positive lens, a cemented doublet negative lens and a singlet positive lens, which can be considered as a positive-negative-positive structure as a whole capable of realizing a large field-of-view angle effect (>50 degrees). But this head-mounted display apparatus has too large aberration residua, such as the field curvature and astigmatism, and too poor image quality at the field edges to achieve high resolution optical effect, so that it is not conducive to long-time and comfortable visual experience.

As another three-coaxial-lens assembly, the positive-positive-negative optical structure having a large field-of-view angle can be applied for the eyepiece optical system. Reference document 10 (Publication No. CN104635333A) has provided an eyepiece optical system adopting the positive-positive-negative optical structure, which is capable of realizing a large field-of-view angle effect (>50 degrees). But meanwhile, such eyepiece optical system has a large off-axis aberration, together with a large residual chromatism, which reduces the optical resolution of the off-axis field and is not good for comfortable visual experience.

Reference document 11 (Publication No. CN104536130A) has provided an eyepiece optical system of positive-positive-negative-positive optical structure having a fourth lens with a positive focal power in additional to the positive-positive-negative three-coaxial-lens optical structure. Reference document 12 (Publication No. U.S. Pat. No. 5,877,900A) has provided an eyepiece optical system, in which a singlet positive lens, a singlet positive lens, a cemented doublet negative lens and a singlet positive lens are arranged coaxially and successively along the optical axis direction from the eye viewing side to the miniature image display apparatus side, and form a positive-positive-negative-positive optical structure as a whole. Although the eyepiece optical systems mentioned in both reference documents are capable of realizing a large field-of-view angle effect (>50 degrees) and meanwhile have a better off-axis aberration, system chromatism, and other optical indices, however, there are still residual aberration, such as the field curvature and astigmatism, which would result in significant difference of the image qualities in the central field and edge field. The closer to the edge, the lower the field optical resolution. No optical effect of high resolution in the full frame range is obtained.

Reference document 13 (Publication No. CN104570323A) has provided an eyepiece optical system, in which a singlet positive lens, a singlet positive lens, a singlet negative lens and a singlet negative lens are arranged coaxially and successively along the optical axis direction from the eye viewing side to the miniature image display apparatus side, and form a positive-positive-negative-negative optical structure. The eyepiece optical system has a large field-of-view angle effect (>70 degrees), while together with a too large distortion (>25%) which results in serious distortion of image display.

Reference document 14 (Publication No. US2014/0218806A1) has provided an eyepiece optical system for head-mounted display, in which a positive lens group constituted by two or three positive lenses and a negative lens group constituted by a cemented doublet lens of a biconcave lens and a biconvex lens or constituted by the cemented doublet lens of a biconcave lens and a biconvex lens and a singlet positive meniscus lens, are arranged coaxially and successively along the optical axis direction from the eye viewing side to the miniature image display apparatus side. The basic structure of the head-mounted display apparatus can be considered as a positive-positive-negative (cemented doublet lens) optical structure. Furthermore, a positive-positive-positive-negative (cemented doublet lens) optical structure is adopted in a preferable embodiment. The eyepiece optical system can obtain a large field-of-view angle effect (>50 degrees) and correct the residual aberration of the optical system. However, there are too many lenses which increase the product size and weight and make it uncomfortable for wearing. Moreover, the surface shape of the lens is too complicated to be produced in massive.

Reference document 15 (Publication No. CN101609208B) has also provided an eyepiece optical system for head-mounted display, in which a singlet positive lens, a singlet positive lens, a cemented doublet negative lens, a singlet positive lens and a singlet lens are arranged coaxially and successively along the optical axis direction from the eye viewing side to the miniature image display apparatus side to form a relatively complicated optical structure, which is capable of realizing a large field-of-view angle effect (>50 degrees). However, the above eyepiece optical systems all have large astigmatisms, and meanwhile when a plurality of lenses (more than 5 lenses) are applied to form an optical system, the product size and weight become too large for comfortable wearing experience.

Reference document 16 (Publication No. CN104965306A) has also provided an eyepiece optical system with a large field-of-view angle, in which a first lens, a second lens, a third lens and a fourth lens are arranged coaxially and successively along the optical axis direction from the eye viewing side to the miniature image display apparatus side to form a relatively complicated optical structure. Although such eyepiece optical system is capable of realizing a large field-of-view angle effect (>75 degrees), however, its image quality declines at the field edges when comparing with that at the field center, so the image quality is not uniform enough in the full frame. At the same time, optical materials having a large refractive index should be employed, which results in manufacturing cost and weight increase and increases manufacture difficulties.

SUMMARY

The object of the present application is to provide an eyepiece optical system with a large field-of-view angle and a head-mounted display apparatus, aiming at the above defects of the prior art.

In one aspect, an eyepiece optical system with a large field-of-view angle is provided for solving above technical problems, which comprising a first lens group having an effective focal length of $f_1$ and a second lens group having an effective focal length of $f_2$ arranged coaxially and successively along an optical axis direction from an eye viewing side to a miniature image display apparatus side, wherein, $f_1$ is a negative value, $f_2$ is a positive value, and the eyepiece optical system has an effective focal length of $f_w$ which satisfies following relations (1) and (2):

$$-50 < f_1/f_w < -0.6 \quad (1);$$

$$0.3 < f_2/f_w < 0.8 \quad (2);$$

wherein, the first lens group is constituted by a first lens close to the eye viewing side and a second lens away from the eye viewing side, wherein the first lens is a biconvex positive lens and the second lens is a negative lens whose optical surface close to the eye viewing side is concave to the eye viewing side and having a negative curvature radius;

wherein, the second lens group is constituted by one or more lenses, and at least comprises a third lens adjacent to the first lens group and being a positive lens;

wherein the first lens, the second lens and the third lens have material characteristics which satisfy following relations (11), (12) and (13):

$$1.50 < Nd_{11} < 1.82 \quad (11);$$

$$1.55 < Nd_{12} < 1.75 \quad (12);$$

$$1.50 < Nd_{23} < 1.78 \quad (13);$$

wherein, $Nd_{11}$, $Nd_{12}$ and $Nd_{23}$ are refractive indices of the first lens, the second lens and the third lens at d line, respectively;

wherein, the first lens, the second lens and the third lens further have material characteristics which satisfy following relations (21), (22) and (23):

$$35 < Vd_{11} < 60 \quad (21);$$

$$21 < Vd_{12} < 35 \quad (22);$$

$$35 < Vd_{23} < 60 \quad (23);$$

wherein, $Vd_{11}$, $Vd_{12}$ and $Vd_{23}$ are abbe numbers of the first lens, the second lens and the third lens at d line, respectively.

In the eyepiece optical system according to the present application, the optical surface of the second lens close to the eye viewing side is an aspheric surface, and two optical surfaces of the second lens having curvature radii satisfy following relation (3):

$$-2.2 < (R_{21}+R_{22})/(R_{21}-R_{22}) < -0.45 \quad (3);$$

wherein, $R_{21}$ is the curvature radius of the optical surface of the second lens close to the eye viewing side, and $R_{22}$ is the curvature radius of an optical surface of the second lens close to an image source side.

In the eyepiece optical system according to the present application, a distance between the first lens and the second lens of the first lens group satisfies following relation (4):

$$0.06 < D_{12}/f_w < 0.30 \quad (4);$$

wherein, $D_{12}$ is the distance between an optical surface center of the first lens close to an image source side and an optical surface center of the second lens close to the eye viewing side along the optical axis direction.

In the eyepiece optical system according to the present application, the effective focal lengths of the first lens group and the second lens group satisfy following relations (9) and (10):

$$-20.78 < f_1/f_w < -1 \quad (9);$$

$$0.45 < f_2/f_w < 0.72 \quad (10).$$

In the eyepiece optical system according to the present application, the effective focal length of the first lens group $f_1$, the effective focal length of the second lens group $f_2$, and the effective focal length of the eyepiece optical system $f_w$ satisfy following relations (1b) and (2b):

$$-5 < f_1/f_w < -1 \quad (1b);$$

$$0.35 < f_2/f_w < 0.51 \quad (2b).$$

In the eyepiece optical system according to the present application, the curvature radii of the second lens satisfy following relation (3a):

$$-1 < (R_{21}+R_{22})/(R_{21}-R_{22}) < -0.5 \quad (3a);$$

wherein, $R_{21}$ is the curvature radius of the optical surface of the second lens close to the eye viewing side, and $R_{22}$ is the curvature radius of an optical surface of the second lens close to an image source side.

In the eyepiece optical system according to the present application, a distance between the first lens and the second lens of the first lens group satisfies following relation (4a):

$$0.1 < D_{12}/f_w < 0.18 \qquad (4a);$$

wherein, $D_{12}$ is the distance between an optical surface center of the first lens close to an image source side and an optical surface center of the second lens close to the eye viewing side along the optical axis direction.

In the eyepiece optical system according to the present application, the first lens, the second lens and the third lens are of glass materials or plastic materials.

In the eyepiece optical system according to the present application, one or more of the first lens, the second lens and the third lenses are axially symmetric aspherical lenses.

In another aspect, an eyepiece optical system with a large field-of-view angle is further provided, which comprising a first lens group having an effective focal length of $f_1$ and a second lens group having an effective focal length of $f_2$ arranged coaxially and successively along an optical axis direction from an eye viewing side to a miniature image display apparatus side, wherein, $f_1$ is a negative value, $f_2$ is a positive value, and the eyepiece optical system has an effective focal length of $f_w$ which satisfies following relations (1) and (2):

$$-50 < f_1/f_w < -0.6 \qquad (1);$$

$$0.3 < f_2/f_w < 0.8 \qquad (2);$$

wherein, the first lens group is constituted by a first lens close to the eye viewing side and a second lens away from the eye viewing side, wherein the first lens is a biconvex positive lens and the second lens is a negative lens whose optical surface close to the eye viewing side is concave to the eye viewing side and having a negative curvature radius;

wherein, the second lens group is constituted by one or more lenses, and at least comprises a third lens adjacent to the first lens group and being a positive lens;

wherein the first lens, the second lens and the third lens have material characteristics which satisfy following relations (11), (12) and (13):

$$1.50 < Nd_{11} < 1.82 \qquad (11);$$

$$1.55 < Nd_{12} < 1.75 \qquad (12);$$

$$1.50 < Nd_{23} < 1.78 \qquad (13);$$

wherein, $Nd_{11}$, $Nd_{12}$ and $Nd_{23}$ are refractive indices of the first lens, the second lens and the third lens at d line, respectively;

wherein, the first lens, the second lens and the third lens further have material characteristics which satisfy following relations (21), (22) and (23):

$$35 < Vd_{11} < 60 \qquad (21);$$

$$21 < Vd_{12} < 35 \qquad (22);$$

$$35 < Vd_{23} < 60 \qquad (23);$$

wherein, $Vd_{11}$, $Vd_{12}$ and $Vd_{23}$ are abbe numbers of the first lens, the second lens and the third lens at d line, respectively;

wherein, the second lens group further comprises a fourth lens located between the third lens and the miniature image display apparatus, wherein the effective focal length of the second lens group $f_2$, and an effective focal length of the third lens $f_{23}$, and an effective focal length of the fourth lens $f_{24}$ satisfy following relations (5) and (6):

$$1 \leq f_{23}/f_2 \leq 1.4 \qquad (5);$$

$$f_{24}/f_2 > 3.5 \qquad (6).$$

In the eyepiece optical system according to the present application, the optical surface of the second lens close to the eye viewing side is an aspheric surface, and two optical surfaces of the second lens having curvature radii satisfy following relation (3):

$$-2.2 < (R_{21}+R_{22})/(R_{21}-R_{22}) < -0.45 \qquad (3);$$

wherein, $R_{21}$ is the curvature radius of the optical surface of the second lens close to the eye viewing side, and $R_{22}$ is the curvature radius of an optical surface of the second lens close to an image source side.

In the eyepiece optical system according to the present application, a distance between the first lens and the second lens of the first lens group satisfies following relation (4):

$$0.06 < D_{12}/f_w < 0.30 \qquad (4);$$

wherein, $D_{12}$ is the distance between an optical surface center of the first lens close to an image source side and an optical surface center of the second lens close to the eye viewing side along the optical axis direction.

In the eyepiece optical system according to the present application, the effective focal lengths of the first lens group and the second lens group satisfy following relations (9) and (10):

$$-20.78 < f_1/f_w < -1 \qquad (9);$$

$$0.45 < f_2/f_w < 0.72 \qquad (10).$$

In the eyepiece optical system according to the present application, the effective focal length of the first lens group $f_1$, the effective focal length of the second lens group $f_2$, and the effective focal length of the eyepiece optical system $f_w$ satisfy following relations (1b) and (2b):

$$-5 < f_1/f_w < -1 \qquad (1b);$$

$$0.35 < f_2/f_w < 0.51 \qquad (2b).$$

In the eyepiece optical system according to the present application, the curvature radii of the second lens satisfy following relation (3a):

$$-1 < (R_{21}+R_{22})/(R_{21}-R_{22}) < -0.5 \qquad (3a);$$

wherein, $R_{21}$ is the curvature radius of the optical surface of the second lens close to the eye viewing side, and $R_{22}$ is the curvature radius of an optical surface of the second lens close to an image source side.

In the eyepiece optical system according to the present application, a distance between the first lens and the second lens of the first lens group satisfies following relation (4a):

$$0.1 < D_{12}/f_w < 0.18 \qquad (4a);$$

wherein, $D_{12}$ is the distance between an optical surface center of the first lens close to an image source side and an optical surface center of the second lens close to the eye viewing side along the optical axis direction.

In the eyepiece optical system according to the present application, the fourth lens is a meniscus lens whose optical surface close to the miniature image display apparatus is concave to the miniature image display apparatus.

In the eyepiece optical system according to the present application, the first lens, the second lens, the third lens and the fourth lens are of glass materials or plastic materials.

In the eyepiece optical system according to the present application, one or more of the first lens, the second lens, the third lens and the fourth lens are axially symmetric aspherical lenses.

In a further aspect, an eyepiece optical system with a large field-of-view angle is further provided, which comprising a first lens group having an effective focal length of $f_1$ and a second lens group having an effective focal length of $f_2$ arranged coaxially and successively along an optical axis direction from an eye viewing side to a miniature image display apparatus side, wherein, $f_1$ is a negative value, $f_2$ is a positive value, and the eyepiece optical system has an effective focal length of $f_w$ which satisfies following relations (1) and (2):

$$-50 < f_1/f_w < -0.6 \qquad (1);$$

$$0.3 < f_2/f_w < 0.8 \qquad (2);$$

wherein, the first lens group is constituted by a first lens close to the eye viewing side and a second lens away from the eye viewing side, wherein the first lens is a biconvex positive lens and the second lens is a negative lens whose optical surface close to the eye viewing side is concave to the eye viewing side and having a negative curvature radius;

wherein, the second lens group is constituted by one or more lenses, and at least comprises a third lens adjacent to the first lens group and being a positive lens;

wherein the first lens, the second lens and the third lens have material characteristics which satisfy following relations (11), (12) and (13):

$$1.50 < Nd_{11} < 1.82 \qquad (11);$$

$$1.55 < Nd_{12} < 1.75 \qquad (12);$$

$$1.50 < Nd_{23} < 1.78 \qquad (13);$$

wherein, $Nd_{11}$, $Nd_{12}$ and $Nd_{23}$ are refractive indices of the first lens, the second lens and the third lens at d line, respectively;

wherein, the first lens, the second lens and the third lens further have material characteristics which satisfy following relations (21), (22) and (23):

$$35 < Vd_{11} < 60 \qquad (21);$$

$$21 < Vd_{12} < 35 \qquad (22);$$

$$35 < Vd_{23} < 60 \qquad (23);$$

wherein, $Vd_{11}$, $Vd_{12}$ and $Vd_{23}$ are abbe numbers of the first lens, the second lens and the third lens at d line, respectively;

wherein, the second lens group further comprises a fourth lens and a fifth lens, wherein the third lens, the fourth lens and the fifth lens are arranged successively from the eye viewing side to the miniature image display apparatus side, wherein the fourth lens is arranged between the third lens and the miniature image display apparatus, and meanwhile the fourth lens and the fifth lens form a cemented doublet lens, wherein the effective focal length of the second lens group $f_2$, and an effective focal length of the third lens $f_{23}$ satisfy following relation (8):

$$1 \leq f_{23}/f_2 \leq 1.6 \qquad (8).$$

In the eyepiece optical system according to the present application, the optical surface of the second lens close to the eye viewing side is an aspheric surface, and two optical surfaces of the second lens having curvature radii satisfy following relation (3):

$$-2.2 < (R_{21}+R_{22})/(R_{21}-R_{22}) < -0.45 \qquad (3);$$

wherein, $R_{21}$ is the curvature radius of the optical surface of the second lens close to the eye viewing side, and $R_{22}$ is the curvature radius of an optical surface of the second lens close to an image source side.

In the eyepiece optical system according to the present application, a distance between the first lens and the second lens of the first lens group satisfies following relation (4):

$$0.06 < D_{12}/f_w < 0.30 \qquad (4);$$

wherein, $D_{12}$ is the distance between an optical surface center of the first lens close to an image source side and an optical surface center of the second lens close to the eye viewing side along the optical axis direction.

In the eyepiece optical system according to the present application, the effective focal lengths of the first lens group and the second lens group satisfy following relations (9) and (10):

$$-20.78 < f_1/f_w < -1 \qquad (9);$$

$$0.45 < f_2/f_w < 0.72 \qquad (10).$$

In the eyepiece optical system according to the present application, the effective focal length of the first lens group $f_1$, the effective focal length of the second lens group $f_2$, and the effective focal length of the eyepiece optical system $f_w$ satisfy following relations (1b) and (2b):

$$-5 < f_1/f_w < -1 \qquad (1b);$$

$$0.35 < f_2/f_w < 0.51 \qquad (2b).$$

In the eyepiece optical system according to the present application, the curvature radii of the second lens satisfy following relation (3a):

$$-1 < (R_{21}+R_{22})/(R_{21}-R_{22}) < -0.5 \qquad (3a);$$

wherein, $R_{21}$ is the curvature radius of the optical surface of the second lens close to the eye viewing side, and $R_{22}$ is the curvature radius of an optical surface of the second lens close to an image source side.

In the eyepiece optical system according to the present application, a distance between the first lens and the second lens of the first lens group satisfies following relation (4a):

$$0.1 < D_{12}/f_w < 0.18 \qquad (4a);$$

wherein, $D_{12}$ is the distance between an optical surface center of the first lens close to an image source side and an optical surface center of the second lens close to the eye viewing side along the optical axis direction.

In the eyepiece optical system according to the present application, the first lens, the second lens, the third lens, the fourth lens and the fifth lens are of glass materials or plastic materials.

In the eyepiece optical system according to the present application, one or more of the first lens, the second lens, the third lens, the fourth lens and the fifth lens are axially symmetric aspherical lenses.

In a still further aspect, a head-mounted display apparatus is provided which comprising a miniature image display apparatus and an eyepiece arranged between eyes and the miniature image display apparatus, wherein, the eyepiece is any one of the eyepiece optical system discussed above.

In the head-mounted display apparatus according to the present application, the miniature image display is an organic electroluminescent light emitting apparatus or a transmissive liquid crystal display apparatus.

In the head-mounted display apparatus according to the present application, the head-mounted display apparatus comprises two same eyepiece optical systems arranged symmetrically.

Following technical effects can be obtained by the present application. The eyepiece optical system has advantages such as compact structure, small size, large field view, high optical resolution and so on, and its exit pupil diameter is larger than that of the common eyepiece. The present eyepiece optical system can adopt spherical lens and aspherical lens collocation, optical plastic and glass combination, thus eliminating the system aberration significantly while reducing the manufacturing costs and product weight, especially obtaining optical indices such as large field-of-view angle, low distortion, smaller chromatic aberration, field curvature and astigmatism, and so on. Such that the observer can watch large images of full frame, high definition and uniform image quality without any distortion and get visual experience of high liveness via the eyepiece optical system according to the present application.

BRIEF DESCRIPTION OF THE DRAWINGS

The present application is further illustrated combining the embodiments and drawings attached.

FIG. 3 (b) is a distortion curve diagram of the eyepiece optical system (three lenses) according to the first embodiment of the present application.

FIG. 6 (b) is a distortion curve diagram of the eyepiece optical system (three lenses) according to the second embodiment of the present application.

FIG. 9 (b) is a distortion curve diagram of the eyepiece optical system (three lenses) according to the third embodiment of the present application.

FIG. 11 is a spot diagram of the eyepiece optical system (three lenses) according to the fourth embodiment of the present application.

FIG. 12 (a) is a field curve diagram of the eyepiece optical system (three lenses) according to the fourth embodiment of the present application.

FIG. 12 (b) is a distortion curve diagram of the eyepiece optical system (three lenses) according to the fourth embodiment of the present application.

FIG. 22 (b) is a distortion curve diagram of the eyepiece optical system (four lenses) according to the eleventh embodiment of the present application.

FIG. 25 (a) is a field curve diagram of the eyepiece optical system (four lenses) according to the twelfth embodiment of the present application.

FIG. 25 (b) is a distortion curve diagram of the eyepiece optical system (four lenses) according to the twelfth embodiment of the present application.

FIG. 26 is a schematic diagram showing the optical path of the eyepiece optical system (four lenses) according to a thirteenth embodiment of the present application.

FIG. 28 (b) is a distortion curve diagram of the eyepiece optical system (four lenses) according to the thirteenth embodiment of the present application.

FIG. 38 ($b$) is a distortion curve diagram of the eyepiece optical system (five lens) according to the twentieth embodiment of the present application.

FIG. 41 ($b$) is a distortion curve diagram of the eyepiece optical system (five lens) according to the twenty-first embodiment of the present application.

DETAILED DESCRIPTION OF THE PREFERRED EMBODIMENT

Figure 1:
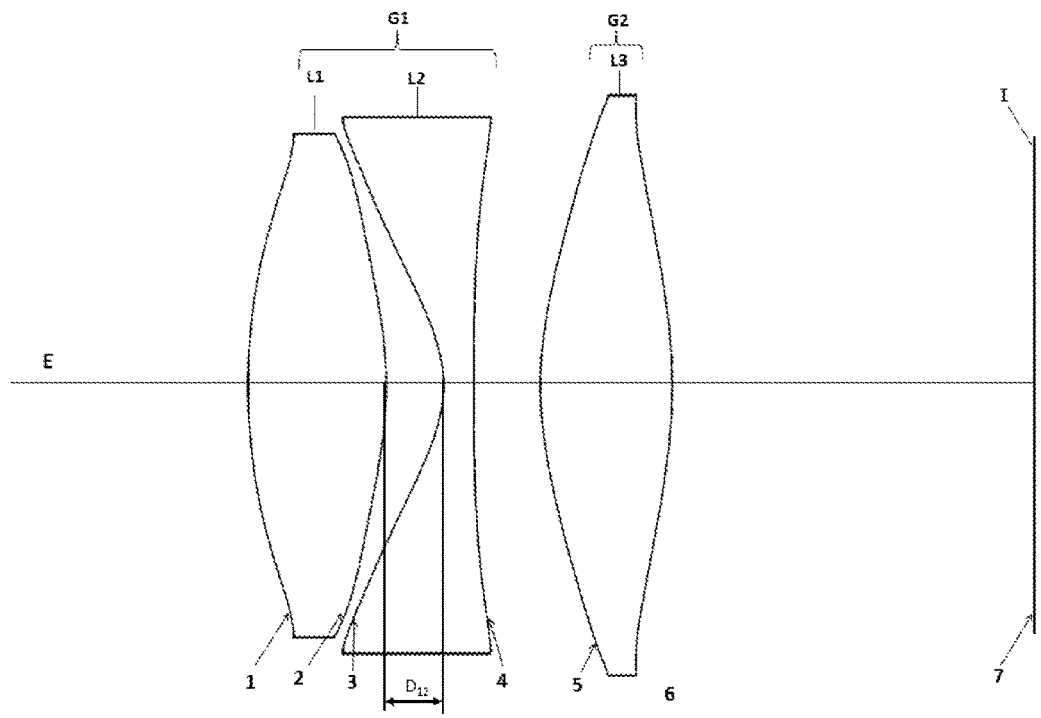
FIG. 1 is a schematic diagram showing the optical path of the eyepiece optical system (three lenses) according to a first embodiment of the present application.

The eyepiece optical system with a large field-of-view angle according to the present application is shown as FIG. 1, which comprising a first lens group having an effective focal length of $f_1$ and a second lens group having an effective focal length of $f_2$ arranged coaxially and successively along an optical axis direction from an eye viewing side to a miniature image display apparatus side, wherein, $f_1$ is a negative value, $f_2$ is a positive value, and the eyepiece optical system has an effective focal length of $f_w$ which satisfies following relations (1) and (2):

$$-50 < f_1/f_w < -0.6 \quad (1);$$

$$0.3 < f_2/f_w < 0.8 \quad (2);$$

wherein, the first lens group is constituted by a first lens close to the eye viewing side and a second lens away from the eye viewing side, wherein the first lens is a biconvex positive lens and the second lens is a negative lens whose optical surface close to the eye viewing side is concave to the eye viewing side and having a negative curvature radius; wherein, the second lens group is constituted by one or more lenses, and at least comprises a third lens adjacent to the first lens group and being a positive lens; wherein the first lens, the second lens and the third lens have material characteristics which satisfy following relations (11), (12) and (13):

$$1.50 < Nd_{11} < 1.82 \quad (11);$$

$$1.55 < Nd_{12} < 1.75 \quad (12);$$

$$1.50 < Nd_{23} < 1.78 \quad (13);$$

wherein, $Nd_{11}$, $Nd_{12}$ and $Nd_{23}$ are refractive indices of the first lens, the second lens and the third lens at d line, respectively; and the first lens, the second lens and the third lens further have material characteristics which satisfy following relations (21), (22) and (23):

$$35 < Vd_{11} < 60 \quad (21);$$

$$21 < Vd_{12} < 35 \quad (22);$$

$$35 < Vd_{23} < 60 \quad (23);$$

wherein, $Vd_{11}$, $Vd_{12}$ and $Vd_{23}$ are abbe numbers of the first lens, the second lens and the third lens at d line, respectively.

In the above embodiment of the present application, the first lens group has corrected the system aberration adequately via the combination of the positive and negative lens, and improved the optical resolution of the system. The overall size of the eyepiece optical system is effectively reduced by combining the first lens of biconcave surfaces with the second lens whose optical surface close to the eye viewing side is concave to the eye viewing side. Moreover, the second lens group can provide enough positive focal power to ensure that the eyepiece optical system can realize a large enough field-of-view angle.

More importantly, on the basis of the above features, a third lens of a refractive index $1.50 < Nd_{23} < 1.78$, that is a third lens with a lower refractive index, is combined with the positive and negative lenses of the first lens group, such that the defects of the prior art can be improved. Consequently, a large field-of-view angle, a low distortion, a high optical resolution can be obtained, the manufacturing difficulty and production cost are reduced, the product weight is lightened, thus greatly improving the user experience of the product. In additional, both the system aberration and the system performance of the optical system are improved via combining the dispersion coefficient of the materials.

In the above embodiments, $Nd_{11}$ can be 1.50, 1.52, 1.57, 1.62, 1.70, 1.73, 1.79, 1.80, and so on.

$Nd_{12}$ can be 1.55, 1.58, 1.62, 1.65, 1.66, 1.68, 1.70, 1.73, and so on.

$Nd_{23}$ can be 1.50, 1.52, 1.57, 1.60, 1.63, 1.65, 1.70, 1.73, and so on.

$Vd_{11}$ can be 35, 36.2, 37.4, 38.1, 40.3, 46.8, 57.4, and so on.

$Vd_{12}$ can be 21, 26.2, 27.4, 28.5, 30.3, 32.8, 33.4, and so on.

$Vd_{13}$ can be 35, 36.2, 37.4, 38.1, 40.3, 46.8, 57.4, and so on.

On the basis of the above embodiment, preferably, the effective focal length of the first lens group $f_1$, the effective focal length of the second lens group $f_2$, and the effective focal length of the eyepiece optical system $f_w$ satisfy following relations (1a) and (2a):

$$-20.78 < f_1/f_w < -1 \qquad (1a)$$

$$0.3 < f_2/f_w < 0.526 \text{ or } 0.700 < f_2/f_w < 0.8 \qquad (2a).$$

The value rang of $f_1/f_w$ and $f_2/f_w$ in the relations (1a) and (2a) is closely related to the system aberration correction, the processing difficulty and the assembly deviation sensitivity of the optical elements. As the value of $f_1/f_w$ in the relation (1a) is greater than −20.78, the system aberration can be corrected adequately to obtain an optical effect of high quality, while as such value is also less than −1, the machinability of the optical elements in such system can also be improved. Furthermore, as the value of $f_2/f_w$ in the relation (2a) is greater than 0.3, the machinability of the optical elements in such system can also be improved, while as such value is less than 0.8, the system aberration can be corrected adequately to obtain an optical effect of higher quality.

Among them, the value of $f_1/f_w$ can be −20.78, −19.22, −18.74, −12.4, −10.56, −5, −6.6, −3.43, −2, −1, etc. The value of $f_2/f_w$ can be 0.3, 0.4, 0.51, 0.526, 0.7, 0.75, 0.78, and so on.

On the basis of the above embodiment, further preferably, the effective focal length of the first lens group $f_1$, the effective focal length of the second lens group $f_2$, and the effective focal length of the eyepiece optical system $f_w$ satisfy following relations (1b) and (2b):

$$-5 < f_1/f_w < -1 \qquad (1b);$$

$$0.35 < f_2/f_w < 0.51 \qquad (2b).$$

By selecting the more preferable value range for the effective focal length of the first lens group, second lens group and the eyepiece optical system, the system optical effect and the manufacturing difficulty can be balanced in a better way.

In a further embodiment, in the above eyepiece optical system, the optical surface of the second lens close to the eye viewing side is an aspheric surface which can correct the system distortion better, and two optical surfaces of the second lens having curvature radii satisfy following relation (3):

$$-2.2 < (R_{21}+R_{22})/(R_{21}-R_{22}) < -0.45 \qquad (3);$$

wherein, $R_{21}$ is the curvature radius of the optical surface of the second lens close to the eye viewing side, and $R_{22}$ is the curvature radius of an optical surface of the second lens close to the image source side.

As the lower limit value condition of $(R_{21}+R_{22})/(R_{21}-R_{22})$ in the relation (3) is greater than −2.2, the second lens can provide enough negative focal power to balance and correct the system aberration, and obtain good optical effect, while as the upper limit value condition of which is less than −0.45, the correction difficulty of spherical aberration is reduced to obtain a large optical aperture.

Among them, the value of $(R_{21}+R_{22})/(R_{21}-R_{22})$ can be −2.2, −1.8, −1.2, −1, −0.8, −0.6, −0.5, etc.

Preferably, the curvature radii of the second lens satisfy following relation (3a):

$$-1 < (R_{21}+R_{22})/(R_{21}-R_{22}) < -0.5 \qquad (3a).$$

The relation (3a) is a more preferable value range of relation (3), which guarantees the aberrations optimization of the optical system, as well as the good manufacturability of the second lens at the same time.

Furthermore, a distance between the first lens and the second lens of the first lens group satisfies following relation (4):

$$0.06 < D_{12}/f_w < 0.30 \qquad (4);$$

wherein, $D_{12}$ is the distance between an optical surface center of the first lens close to the image source side and an optical surface center of the second lens close to the eye viewing side along the optical axis direction.

As the lower limit value of $D_{12}/f_w$ in the relation (4) is greater than 0.06, the correction difficulty of off-axis aberration is reduced to ensure that the field edges and the filed center achieve a high image quality at the same time, thus obtaining a uniform image quality in the full frame; while as the upper limit value of which is less than 0.3, it is beneficial to reduction of total system length and product miniaturization.

Among them, the value of $D_{12}/f_w$ can be 0.06, 0.08, 0.1, 0.14, 0.15, 0.18, 0.20, 0.24, 0.26, and so on.

Preferably, the distance between the first lens and the second lens of the first lens group satisfies following relation (4a):

$$0.1 < D_{12}/f_w < 0.18 \qquad (4a);$$

The relation (4a) is a more preferable value range of relation (4), which is beneficial to the better optimization of aberration at different levels, and miniaturization of the total system length at the same time.

In a further embodiment, the second lens group further comprises a fourth lens located between the third lens and the miniature image display apparatus, wherein the effective focal length of the second lens group $f_2$, the effective focal length of the third lens $f_{23}$ and the effective focal length of the fourth lens $f_{24}$ satisfy following relations (5) and (6):

$$1 \le f_{23}/f_2 \le 1.4 \qquad (5);$$

$$f_{24}/f_2 > 3.5 \qquad (6).$$

Among them, the value of $f_{23}/f_2$ can be 1, 1.1, 1.2, 1.3, 1.4, etc. The value of $f_{24}/f_2$ can be 3.5, 3.6, 3.7, 3.8, 4.7, 5.8, 6.9, and so on.

In the above further embodiment, the addition of the fourth lens with the positive focal power is beneficial to larger field-of-view angle and higher optical resolution. The relation (5) chooses a value which is greater than or equal to 1, to reduce the manufacturing difficulty of the third lens and the material request of high refractive index, and is also less than or equal to 1.4, to be conducive to the realization of the telecentric system in image space. The relation (6) chooses a value which is greater than 3.5, to ensure that the system back focal length is large enough for facilitating the eyepiece optical system to realize a visual adjustment of a wide range.

In a further embodiment, the fourth lens is a meniscus lens whose optical surface close to the miniature image display apparatus is concave to the miniature image display apparatus, so as to further improve the aberration residua, such as the field curvature and astigmatism, and be of benefit for the eyepiece optical system to obtain a high optical resolution of uniform image quality in the full frame.

In a further embodiment, the fourth lens has material characteristics which satisfy following relations (71) and (72):

$$1.50 < Nd_{24} < 1.75 \qquad (71);$$

$$40 < Vd_{24} < 65 \qquad (72);$$

wherein, $Nd_{24}$ is refractive index of the fourth lens at d line, and $Vd_{23}$ is abbe numbers of the fourth lens at d line, respectively.

Preferably, the fourth lens has material characteristics which satisfy following relations (71a) and (72a):

$$1.6 < Nd_{24} < 1.65 \tag{71a}$$

$$50 < Vd_{24} < 61 \tag{72a}$$

wherein, $Nd_{24}$ is refractive index of the fourth lens at d line, and $Vd_{23}$ is abbe numbers of the fourth lens at d line, respectively.

In a further embodiment, the second lens group further comprises a fourth lens and a fifth lens, wherein the third lens, the fourth lens and the fifth lens are arranged successively from the eye viewing side to the miniature image display apparatus side. Meanwhile, the fourth lens and the fifth lens form a cemented doublet lens, wherein the effective focal length of the second lens group $f_2$, and the effective focal length of the third lens $f_{23}$ satisfy following relation (8):

$$1 \leq f_{23}/f_2 \leq 1.6 \tag{8}$$

The lower limit value of $f_{23}/f_2$ in the relation (8) is greater than 1 for reducing the manufacturing difficulty of the third lens and the material request of high refractive index, while the upper limit value of which is also less than 1.6, to be conducive to the realization of the telecentric path in image space.

In a further embodiment, the effective focal lengths of the first lens group and the second lens group satisfy following relations (9) and (10):

$$-20.78 < f_1/f_w < -1 \tag{9}$$

$$0.45 < f_2/f_w < 0.72 \tag{10}$$

By further optimizing the value ranges of the effective focal lengths for the first lens group, the second lens group and the optical system, the optical performance and the manufacturing difficulty of the optical system are better balanced.

Among them, the value of $f_1/f_w$ can be −21, −18.2, −15.7, −10.1, −8.5, −7.3, −6.1, −5.1, −2, −1, and −1.5, while value of $f_2/f_w$ can be 0.45, 0.52, 0.63, 0.68, 0.70, and 0.72.

In a further embodiment, the first lens, the second lens and the third lens are made of glass or plastic materials.

The aberration at different levels is corrected completely, and meanwhile the manufacturing cost of the optical element and the weight of the optical system are also controlled.

In a further embodiment, the optical surfaces of the first lens, the second lens and the third lens are axisymmetric aspheric surfaces having an aspheric surface expression (a) as follows:

wherein, z is the sagittal height of the optical plane; c is the curvature at top of the aspheric $$z = \frac{cr^2}{1 + \sqrt{1 - (1+k)c^2 r^2}} + \alpha_2 r^2 + \alpha_4 r^4 + \alpha_6 r^6 + \ldots \tag{a}$$

surface; k is the aspheric coefficient; α, 2, 4, 6 ... are order coefficients, and r is the distance coordinate from the point on the surface to the optical axis of the lens system.

Such arrangement enables the aberration of the optical system (including spherical aberration, coma, field distortion, field curvature, astigmatism chromatic aberration and other high-order aberrations) are completely corrected, which would help the eyepiece optical system to obtain the large view angle and the large aperture, while further improving the image quality at both of the field center and field edges, reducing the image quality difference between the field center and field edges, thus realizing more uniform image quality in the full frame and low distortion.

In a further embodiment, one or more (such as two, three, four or five) of the first lens, the second lens, the third lens, the fourth lens and the fifth lens are axisymmetric aspheric lenses.

In such a way, the aberration at different levels is corrected completely, and the optical performance of the eyepiece optical system is further improved.

The principle, scheme and display results of the eyepiece optical system are described in more detail combining the following embodiments.

In the following embodiments, the diaphragm E can be the exit pupil of imaging for the eyepiece optical system. It is a virtual aperture. The best imaging effect can be observed when the pupil of the human eye is positioned at the diaphragm location.

[Embodiment 1]

As shown in FIG. 1, in the schematic diagram showing the optical path of the eyepiece optical system (three lens) according to a first embodiment of the present application, the diaphragm E, the first lens group G1, the second lens group G2, and the display apparatus I are arranged successively from the eye viewing side to the display apparatus I side (from left to right). The first lens group G1 consists of the first lens L1 and the second lens L2, and the second lens group G2 consists of the third lens L3. In the present embodiment, the diaphragm E can be the exit pupil of imaging for the eyepiece optical system. It is a virtual aperture. The best imaging effect can be observed when the pupil of the human eye is positioned at the diaphragm location. In the present embodiment, the first lens L1 is a positive lens, the second lens L2 is a negative lens, which two lenses form the first lens group G1 having a negative focal power. The first lens L1 has a biconvex face shape, the optical surface of the second lens L2 towards the eye viewing side is concave to the eye viewing side. Furthermore, the first lens L1 and the second lens L2 both have even aspheric face shapes, such that the aberration residua of the system, such as the distortion, the field curvature and astigmatism and so on, can be corrected completely. In the present embodiment, the third lens L3 constituting of the second lens group G2 is a biconvex positive lens having an even aspheric face shape, and can be used for providing enough positive focal power to achieve a large view angle. In this case, the optical surface closer to the diaphragm E side has a serial number of 1, and so on (the optical surface from left to right has a serial number of 2, 3, 4, 5 and 6, respectively). And the surface of the display apparatus I has a serial number of 7.

The design data of the eyepiece optical system according to the first embodiment is shown in table 1.

TABLE 1

Embodiment 1: effective focal length: 20.1 mm, field-of-view angle: 2ω = 48°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 21.77 | 5.5 | 1.772 | 50.0 | 19 | −1.12 |
| 2 | −13.00 | 2.3 | | | 19 | −0.30 |
| 3 | −4.47 | 1.2 | 1.722 | 29.2 | 20 | −2.55 |
| 4 | 115.97 | 2.6 | | | 20 | 4.60 |
| 5 | 12.00 | 5.3 | 1.743 | 49.3 | 22 | −10.40 |
| 6 | −18.39 | 14.4 | | | 22 | −6.07 |
| 7 Display apparatus | Infinite | | | | | |

Figure 2:
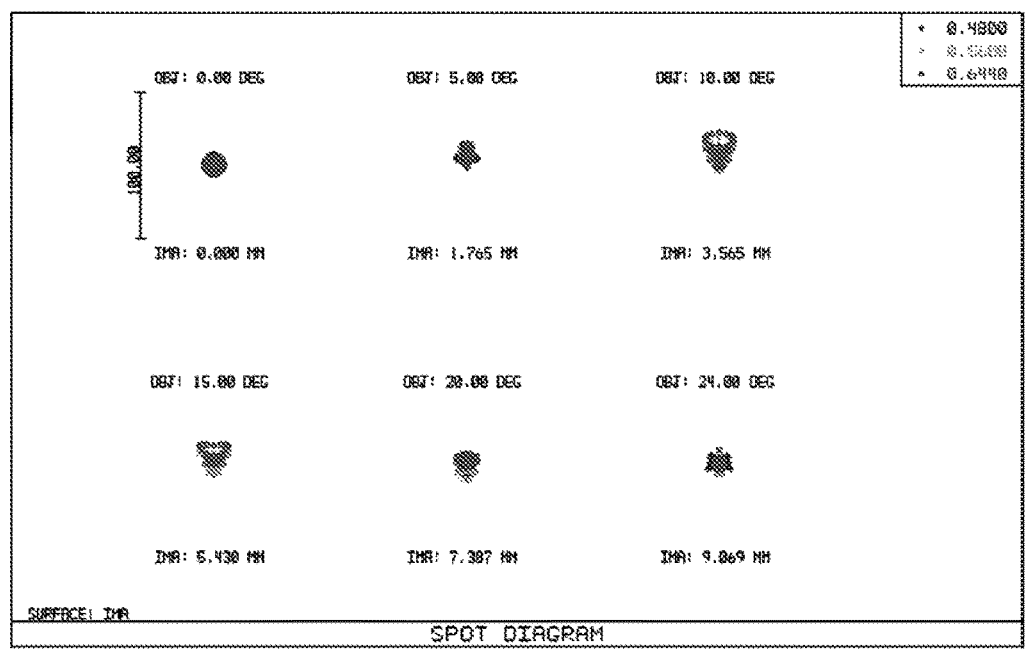
FIG. 2 is a spot diagram of the eyepiece optical system (three lenses) according to the first embodiment of the present application.

FIG. 2 has shown the spot diagram of the eyepiece optical system according to the first embodiment of the present application. The spot diagram reflecting the geometric structure of the optical imaging system, can be represented by dispersion spots formed by the section of the specified wavelength light focused on the image plane in the specified field, while ignoring the diffraction effect, and meanwhile, it can comprise multiple field-of-views and lights of multiple wavelengths. Therefore, the imaging quality of the optical system can be evaluated intuitively through the intensive degree, the shape and size of the dispersion spots in the spot diagram, while the chromatism of the optical system can also be evaluated intuitively through the misalignment degree of the dispersion spots with different wavelengths in the spot diagram. The smaller the RMS radius (root-mean-square radius) of the spot diagram, the higher the imaging quality of the optical system. As shown in FIG. 2 of the spot diagram according to the first embodiment of the present application, the lights of different field-of-views in the present embodiment have dispersion spots of small and uniform radii on the image plane (display apparatus I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

Figure 3A:
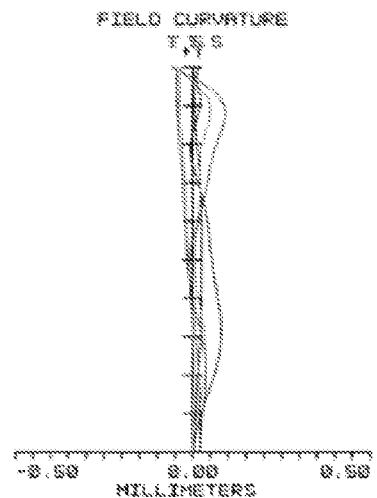
FIG. 3 (a) is a field curve diagram of the eyepiece optical system (three lenses) according to the first embodiment of the present application.
Figure 3B:
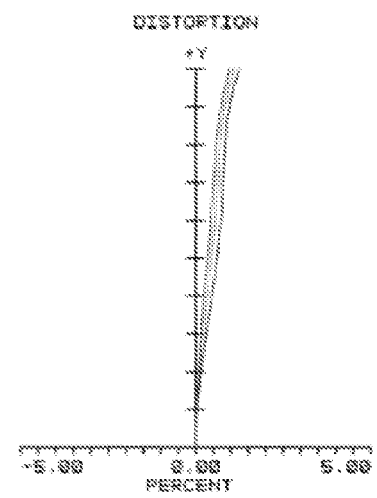

FIG. 3 (a) and FIG. 3 (b) have respectively shown the field curvature and distortion curve of the eyepiece optical system according to the first embodiment of the present application, by which the characteristics of the present optical system such as super large field-of-view and high imaging quality and so on, have been represented.

[Embodiment 2]

Figure 4:
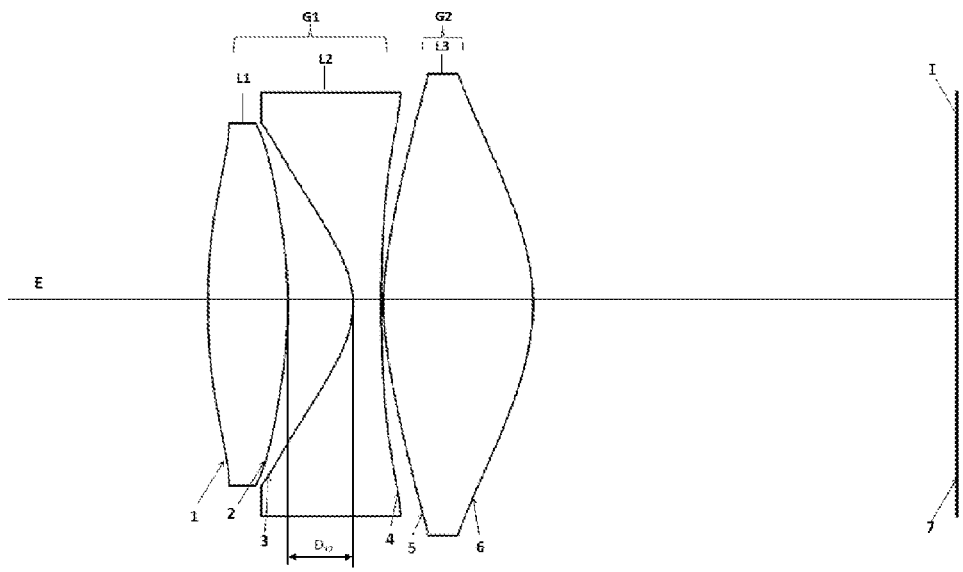
FIG. 4 is a schematic diagram showing the optical path of the eyepiece optical system (three lenses) according to a second embodiment of the present application.

As shown in FIG. 4, in the schematic diagram showing the optical path of the eyepiece optical system according to a second embodiment of the present application, the diaphragm E, the first lens group G1, the second lens group G2, and the display apparatus I are arranged successively from the eye viewing side to the display apparatus I side (from left to right). The first lens group G1 consists of the first lens L1 and the second lens L2, and the second lens group G2 consists of the third lens L3. In the present embodiment, the first lens L1 is a positive lens, the second lens L2 is a negative lens, which two lenses form the first lens group G1 having a negative focal power. The first lens L1 has a biconvex face shape, the optical surface of the second lens L2 towards the eye viewing side is concave to the eye viewing side. Furthermore, the first lens L1 and the second lens L2 both have even aspheric face shapes, such that the aberration residua of the system, such as the distortion, field curvature and chromatism, can be corrected completely. In the present embodiment, the third lens L3 constituting the second lens group G2 is a biconvex positive lens having an even aspheric face shape, and can be used for providing enough positive focal power to achieve a large view angle. In this case, the optical surface closer to the diaphragm E side has a serial number of 1, and so on (the optical surface from left to right has a serial number of 2, 3, 4, 5 and 6, respectively). And the surface of the display apparatus I has a serial number of 7.

The design data of the eyepiece optical system according to the second embodiment is shown in table 2.

TABLE 2

Embodiment 2: effective focal length: 20.1 mm, field-of-view angle: 2ω = 48°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 27.83 | 3.4 | 1.810 | 40.9 | 17 | −0.25 |
| 2 | −17.86 | 2.8 | | | 17 | 1.87 |
| 3 | −3.84 | 1.2 | 1.722 | 29.2 | 18 | −1.93 |
| 4 | 57.66 | 0.1 | | | 19 | −15.80 |
| 5 | 11.99 | 6.4 | 1.772 | 50.0 | 21 | −19.75 |
| 6 | −9.07 | 18.0 | | | 21 | −2.65 |
| 7 Display apparatus | Infinite | | | | | |

Figure 5:
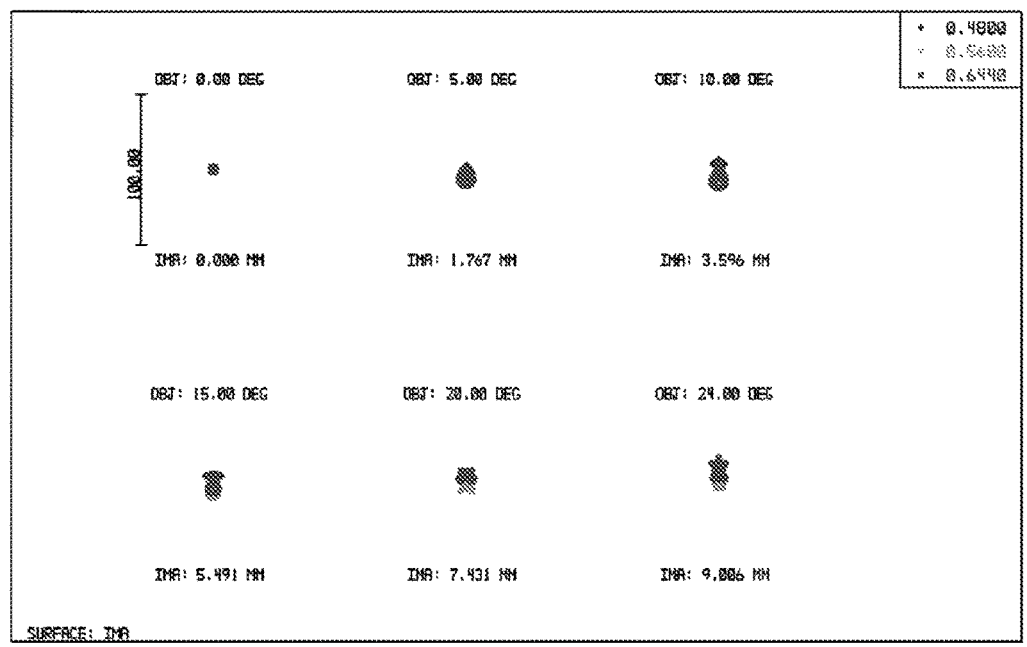
FIG. 5 is a spot diagram of the eyepiece optical system (three lenses) according to the second embodiment of the present application.

FIG. 5 has shown the spot diagram of the eyepiece optical system according to the second embodiment of the present application. The spot diagram reflecting the geometric structure of the optical imaging system, can be represented by dispersion spots formed by the section of the specified wavelength light focused on the image plane in the specified field, while ignoring the diffraction effect, and meanwhile, it can comprise multiple field-of-views and lights of multiple wavelengths. Therefore, the imaging quality of the optical system can be evaluated intuitively through the intensive degree, the shape and size of the dispersion spots in the spot diagram, while the chromatism of the optical system can also be evaluated intuitively through the misalignment degree of the dispersion spots with different wavelengths in the spot diagram. The smaller the RMS radius (root-mean-square radius) of the spot diagram, the higher the imaging quality of the optical system. As shown in FIG. 5 of the spot diagram according to the second embodiment of the present application, the lights of different field-of-views in the present embodiment have dispersion spots of small and uniform radii on the image plane (display apparatus I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

Figure 6A:
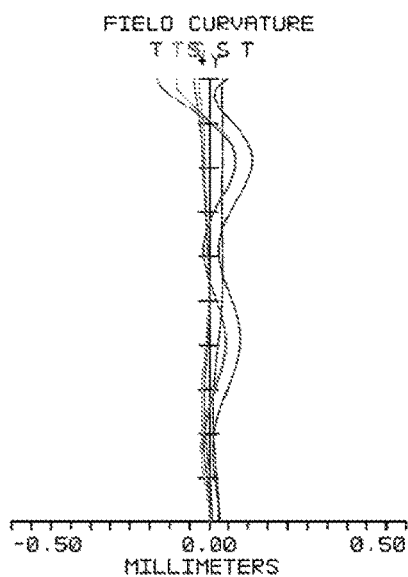
FIG. 6 (a) is a field curve diagram of the eyepiece optical system (three lenses) according to the second embodiment of the present application.
Figure 6B:
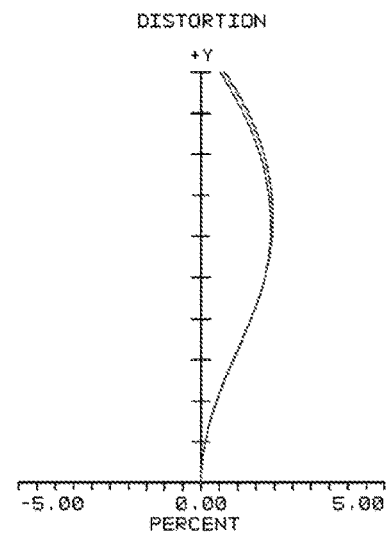

FIG. 6 (a) and FIG. 6 (b) have respectively shown the field curvature and distortion curve of the eyepiece optical system according to the second embodiment of the present application, by which the characteristics of the present optical system such as super large field-of-view and high imaging quality and so on, have been represented.

[Embodiment 3]

Figure 7:
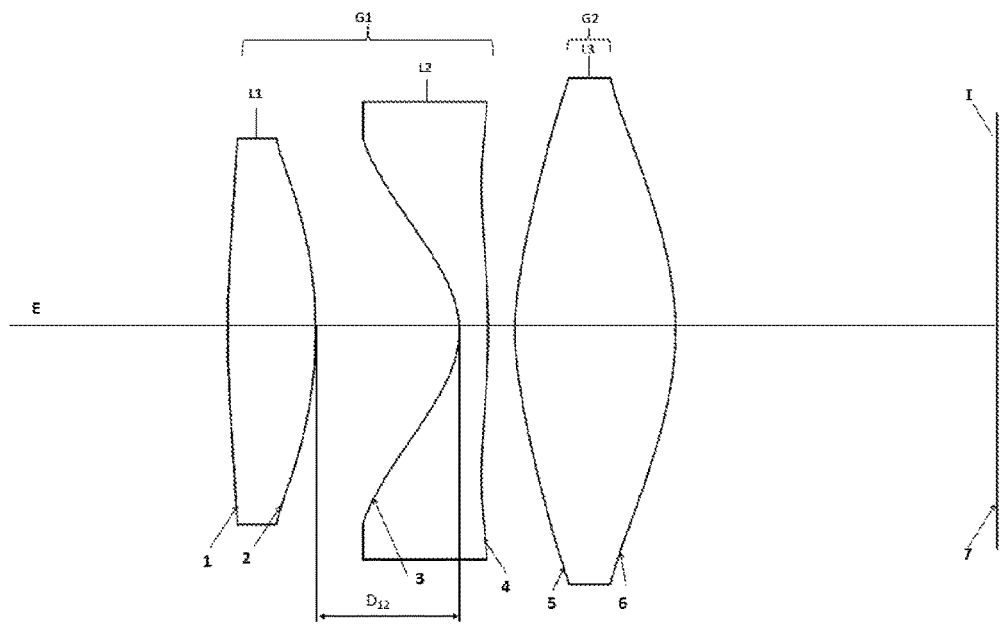
FIG. 7 is a schematic diagram showing the optical path of the eyepiece optical system (three lenses) according to a third embodiment of the present application.

As shown in FIG. 7, in the schematic diagram showing the optical path of the eyepiece optical system according to a third embodiment of the present application, the diaphragm E, the first lens group G1, the second lens group G2, and the display apparatus I are arranged successively from the eye viewing side to the display apparatus I side (from left to right). The first lens group G1 consists of the first lens L1 and the second lens L2, and the second lens group G2 consists of the third lens L3. In the present embodiment, the first lens L1 is a positive lens, the second lens L2 is a negative lens, which two lenses form the first lens group G1 having a negative focal power. The first lens L1 has a biconvex face shape, the optical surface of the second lens L2 towards the eye viewing side is concave to the eye viewing side. Furthermore, the first lens L1 and the second lens L2 both have even aspheric face shapes, such that the aberration residua of the system, such as the distortion, field curvature and chromatism, can be corrected completely. In the present embodiment, the third lens L3 constituting of the second lens group G2 is a biconvex positive lens having an even aspheric face shape, and can be used for providing enough positive focal power to achieve a large view angle. In this case, the optical surface closer to the diaphragm E side has a serial number of 1, and so on (the optical surface from left to right has a serial number of 2, 3, 4, 5 and 6, respectively). And the surface of the display apparatus I has a serial number of 7.

The design data of the eyepiece optical system according to the third embodiment is shown in table 3.

TABLE 3

Embodiment 3: effective focal length: 20.0 mm, field-of-view angle: 2ω = 48°

| Serial number of Surfaces | Curvature radius (mm) | Thickness (mm) | Refractive index | Abbe number | Diameter (mm) | Aspheric coefficient |
| --- | --- | --- | --- | --- | --- | --- |
| OBJ | Infinite | Infinite | | | | |
| 1 | 56.14 | 3.6 | 1.810 | 40.9 | 17 | −46.80 |
| 2 | −18.44 | 6.0 | | | 17 | 2.65 |
| 3 | −3.75 | 1.2 | 1.636 | 24.0 | 19 | −1.87 |
| 4 | −27.59 | 1.1 | | | 19 | −35.42 |
| 5 | 11.99 | 6.6 | 1.772 | 50.0 | 22 | −18.30 |
| 6 | −13.16 | 13.3 | | | 22 | −2.28 |
| 7 Display apparatus | Infinite | | | | | |

Figure 8:
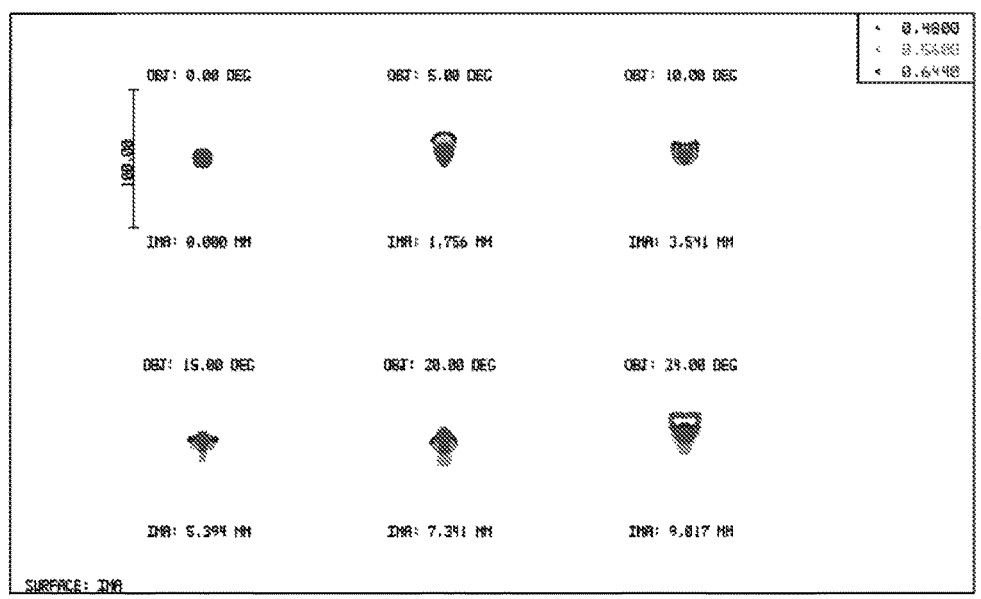
FIG. 8 is a spot diagram of the eyepiece optical system (three lenses) according to the third embodiment of the present application.

FIG. 8 has shown the spot diagram of the eyepiece optical system according to the third embodiment of the present application. The spot diagram reflecting the geometric structure of the optical imaging system, can be represented by dispersion spots formed by the section of the specified wavelength light focused on the image plane in the specified field, while ignoring the diffraction effect, and meanwhile, it can comprise multiple field-of-views and lights of multiple wavelengths. Therefore, the imaging quality of the optical system can be evaluated intuitively through the intensive degree, the shape and size of the dispersion spots in the spot diagram, while the chromatism of the optical system can also be evaluated intuitively through the misalignment degree of the dispersion spots with different wavelengths in the spot diagram. The smaller the RMS radius (root-mean-square radius) of the spot diagram, the higher the imaging quality of the optical system. As shown in FIG. 8 of the spot diagram according to the third embodiment of the present application, the lights of different field-of-views in the present embodiment have dispersion spots of small and uniform radii on the image plane (display apparatus I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

Figure 9A:
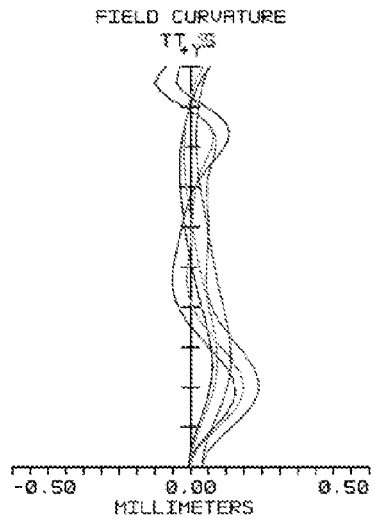
FIG. 9 (a) is a field curve diagram of the eyepiece optical system (three lenses) according to the third embodiment of the present application.
Figure 9B:
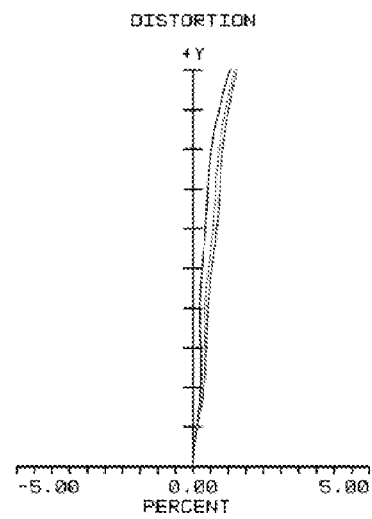

FIG. 9 (a) and FIG. 9 (b) have respectively shown the field curvature and distortion curve of the eyepiece optical system according to the third embodiment of the present application, by which the characteristics of the present optical system such as super large field-of-view and high imaging quality and so on, have been represented.

[Embodiment 4]

Figure 10:
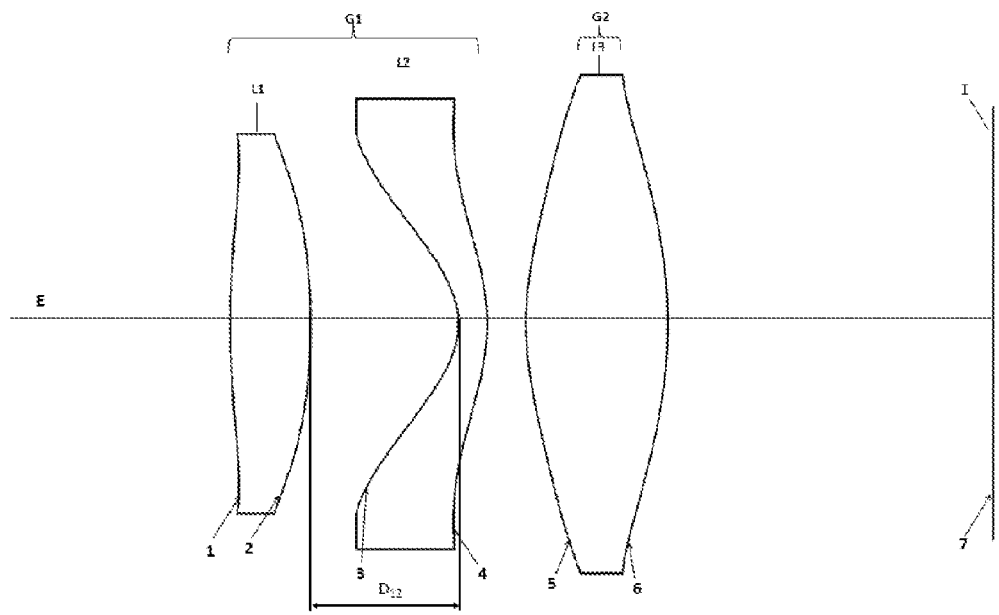
FIG. 10 is a schematic diagram showing the optical path of the eyepiece optical system (three lenses) according to a fourth embodiment of the present application.

As shown in FIG. 10, in the schematic diagram showing the optical path of the eyepiece optical system according to a fourth embodiment of the present application, the diaphragm E, the first lens group G1, the second lens group G2, and the display apparatus I are arranged successively from the eye viewing side to the display apparatus I side (from left to right). The first lens group G1 consists of the first lens L1 and the second lens L2, and the second lens group G2 consists of the third lens L3. In the present embodiment, the first lens L1 is a positive lens, the second lens L2 is a negative lens, which two lenses form the first lens group G1 having a negative focal power. The first lens L1 has a biconvex face shape, the optical surface of the second lens L2 towards the eye viewing side is concave to the eye viewing side. Furthermore, the first lens L1 and the second lens L2 both have even aspheric face shapes, such that the aberration residua of the system, such as the distortion, field curvature and chromatism, can be corrected completely. In the present embodiment, the third lens L3 constituting of the second lens group G2 is a biconvex positive lens having an even aspheric face shape, and can be used for providing enough positive focal power to achieve a large view angle. In this case, the optical surface closer to the diaphragm E side has a serial number of 1, and so on (the optical surface from left to right has a serial number of 2, 3, 4, 5 and 6, respectively). And the surface of the display apparatus I has a serial number of 7.

The design data of the eyepiece optical system according to the fourth embodiment is shown in table 4.

TABLE 4

Embodiment 4: effective focal length: 20.1 mm, field-of-view angle: 2ω = 48°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 41.33 | 3.4 | 1.810 | 40.9 | 17 | −25.53 |
| 2 | −25.81 | 6.2 | | | 17 | 4.83 |
| 3 | −3.25 | 1.2 | 1.650 | 21.7 | 19 | −1.77 |
| 4 | −8.49 | 1.6 | | | 19 | −5.80 |
| 5 | 11.98 | 6.0 | 1.772 | 50.0 | 22 | −16.49 |
| 6 | −19.14 | 13.7 | | | 22 | −0.81 |
| 7 Display apparatus | Infinite | | | | | |

FIG. 11 has shown the spot diagram of the eyepiece optical system according to the fourth embodiment of the present application. The spot diagram reflecting the geometric structure of the optical imaging system, can be represented by dispersion spots formed by the section of the specified wavelength light focused on the image plane in the specified field, while ignoring the diffraction effect, and meanwhile, it can comprise multiple field-of-views and lights of multiple wavelengths. Therefore, the imaging quality of the optical system can be evaluated intuitively through the intensive degree, the shape and size of the dispersion spots in the spot diagram, while the chromatism of the optical system can also be evaluated intuitively through the misalignment degree of the dispersion spots with different wavelengths in the spot diagram. The smaller the RMS radius (root-mean-square radius) of the spot diagram, the higher the imaging quality of the optical system. As shown in FIG. 11 of the spot diagram according to the fourth embodiment of the present application, the lights of different field-of-views in the present embodiment have dispersion spots of small and uniform radii on the image plane (display apparatus I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

FIG. 12 (a) and FIG. 12 (b) have respectively shown the field curvature and distortion curve of the eyepiece optical system according to the fourth embodiment of the present application, by which the characteristics of the present optical system such as super large field-of-view and high imaging quality and so on, have been represented.

In the following embodiments 5-10, the optical path of the eyepiece optical systems are corresponding to FIG. 13-18, respectively, in which the diaphragm E, the first lens group G1, the second lens group G2, and the display apparatus I are arranged successively from the eye viewing side to the display apparatus I side (from left to right). The first lens group G1 consists of the first lens L1 and the second lens L2, and the second lens group G2 consists of the third lens L3. In the present embodiment, the first lens L1 is a positive lens, the second lens L2 is a negative lens, which two lenses form the first lens group G1 having a negative focal power. The first lens L1 has a biconvex face shape, the optical surface of the second lens L2 towards the eye viewing side is concave to the eye viewing side. Furthermore, the first lens L1 and the second lens L2 both have even aspheric face shapes, such that the aberration residua of the system, such as the distortion, field curvature and chromatism, can be corrected completely. In the present embodiment, the third lens L3 constituting of the second lens group G2 is a biconvex positive lens having an even aspheric face shape, and can be used for providing enough positive focal power to achieve a large view angle. In this case, the optical surface closer to the diaphragm E side has a serial number of 1, and so on (the optical surface from left to right has a serial number of 2, 3, 4, 5 and 6, respectively). And the surface of the display apparatus I has a serial number of 7. The design data of the eyepiece optical systems are shown in as follows, respectively.

[Embodiment 5]

Figure 13:
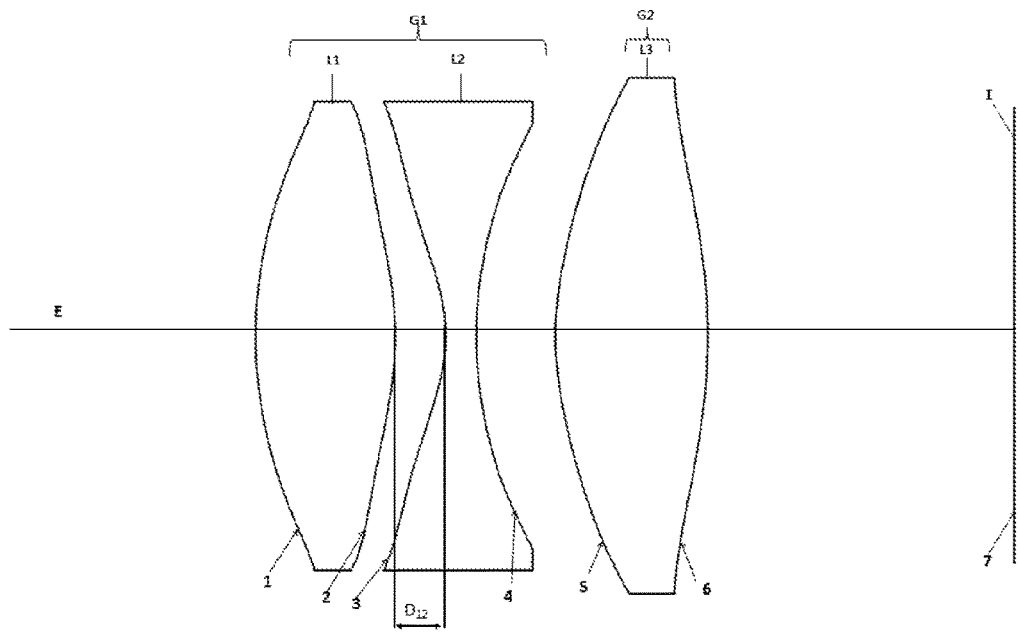
FIG. 13 is a schematic diagram showing the optical path of the eyepiece optical system (three lenses) according to a fifth embodiment of the present application.

The optical path of the eyepiece optical system is as shown in FIG. 13, and the design data of the eyepiece optical system according to the fifth embodiment is shown in table 5.

TABLE 5

Embodiment 5: effective focal length: 20.1 mm, field-of-view angle: 2ω = 48°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 17.90 | 5.5 | 1.772 | 50.0 | 20 | −6.69 |
| 2 | −13.00 | 2.0 | | | 20 | −0.56 |
| 3 | −6.26 | 1.2 | 1.722 | 29.2 | 20 | −4.55 |
| 4 | 16.65 | 3.2 | | | 20 | 1.71 |
| 5 | 12.88 | 6.0 | 1.772 | 50.0 | 22 | −10.69 |
| 6 | −23.27 | 12.1 | | | 22 | 0.81 |
| 7 Display apparatus | Infinite | | | | | |

After measurement, the lights of different field-of-views in the present embodiment have dispersion spots of small and uniform radii on the image plane (display apparatus I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

[Embodiment 6]

Figure 14:
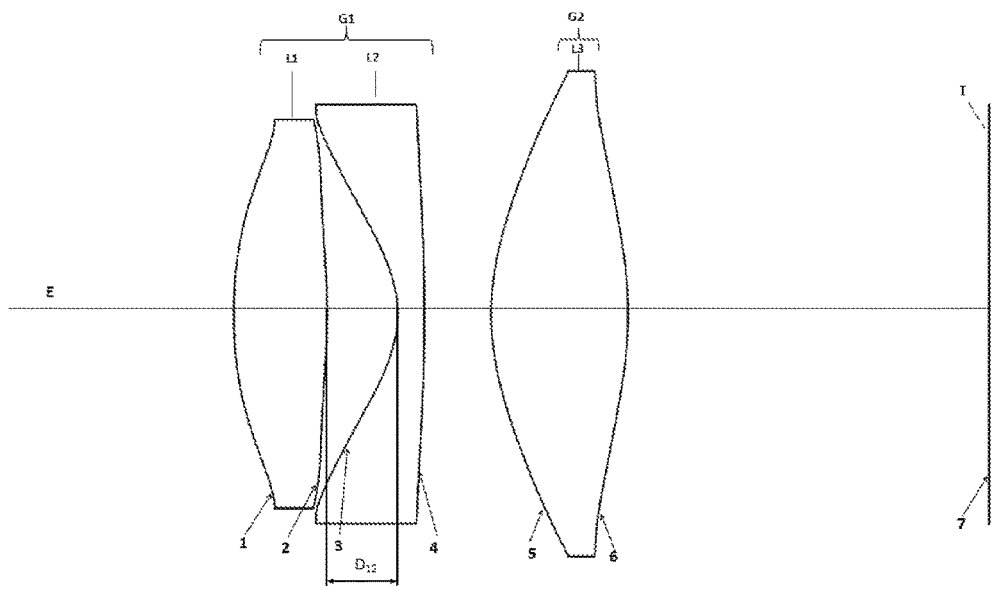
FIG. 14 is a schematic diagram showing the optical path of the eyepiece optical system (three lenses) according to a sixth embodiment of the present application.

The optical path of the eyepiece optical system is as shown in FIG. 14, and the design data of the eyepiece optical system according to the sixth embodiment is shown in table 6.

TABLE 6

Embodiment 6: effective focal length: 20.8 mm, field-of-view angle: 2ω = 48°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 19.53 | 4.2 | 1.632 | 63.8 | 18 | 0.47 |
| 2 | −28.20 | 3.2 | | | 18 | 2.86 |
| 3 | −5.09 | 1.2 | 1.582 | 31.2 | 20 | −2.13 |
| 4 | −90.44 | 3.0 | | | 20 | 32.46 |
| 5 | 11.60 | 6.2 | 1.632 | 63.8 | 23 | −6.10 |
| 6 | −17.04 | 16.3 | | | 23 | −9.12 |
| 7 Display apparatus | Infinite | | | | | |

After measurement, the lights of different field-of-views in the present embodiment have dispersion spots of small and uniform radii on the image plane (display apparatus I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

[Embodiment 7]

Figure 15:
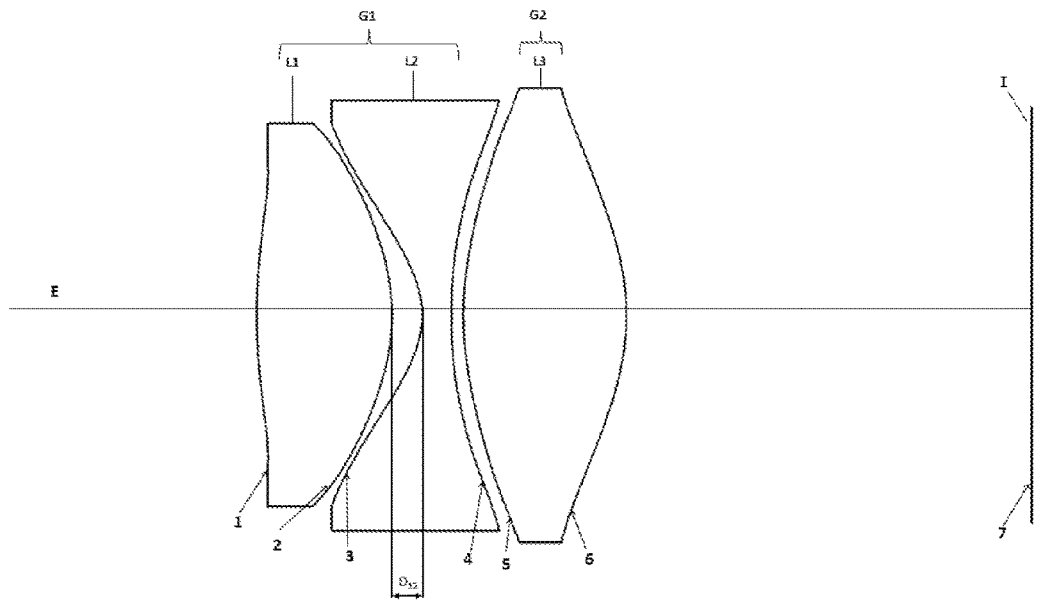
FIG. 15 is a schematic diagram showing the optical path of the eyepiece optical system (three lenses) according to a seventh embodiment of the present application.

The optical path of the eyepiece optical system is as shown in FIG. 15, and the design data of the eyepiece optical system according to the seventh embodiment is shown in table 7.

TABLE 7

Embodiment 7: effective focal length: 19.3 mm, field-of-view angle: 2ω = 48°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 25.16 | 5.6 | 1.743 | 49.3 | 17 | −7.74 |
| 2 | −8.56 | 1.3 | | | 17 | −0.34 |
| 3 | −3.73 | 1.2 | 1.693 | 33.7 | 20 | −2.15 |
| 4 | 18.83 | 0.5 | | | 20 | 0.77 |
| 5 | 12.00 | 6.8 | 1.743 | 49.3 | 21 | −16.94 |
| 6 | −10.09 | 16.9 | | | 21 | −2.73 |
| 7 Display apparatus | Infinite | | | | | |

After measurement, the lights of different field-of-views in the present embodiment have dispersion spots of small and uniform radii on the image plane (display apparatus I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

[Embodiment 8]

Figure 16:
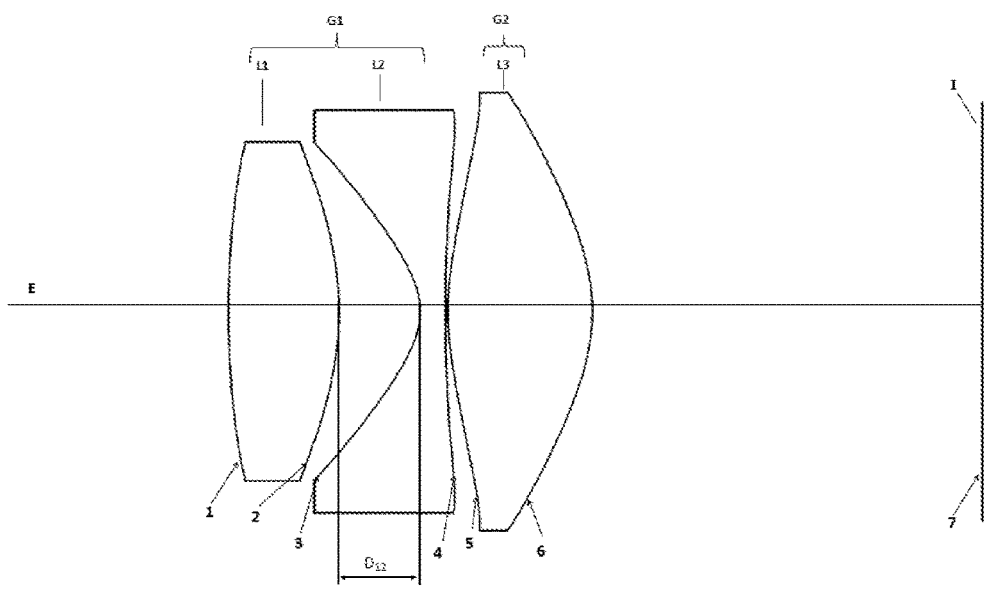
FIG. 16 is a schematic diagram showing the optical path of the eyepiece optical system (three lenses) according to an eighth embodiment of the present application.

The optical path of the eyepiece optical system is as shown in FIG. 16, and the design data of the eyepiece optical system according to the eighth embodiment is shown in table 8.

TABLE 8

Embodiment 8: effective focal length: 22.0 mm, field-of-view angle: 2ω = 48°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 48.01 | 5.2 | 1.743 | 49.3 | 17 | −96.27 |
| 2 | −14.07 | 3.8 | | | 17 | 1.36 |
| 3 | −3.48 | 1.2 | 1.693 | 33.7 | 20 | −2.11 |
| 4 | 92.43 | 0.1 | | | 20 | −8.88 |
| 5 | 11.83 | 6.8 | 1.743 | 49.3 | 22 | −24.46 |
| 6 | −8.93 | 18.4 | | | 22 | −2.82 |
| 7 Display apparatus | Infinite | | | | | |

After measurement, the lights of different field-of-views in the present embodiment have dispersion spots of small and uniform radii on the image plane (display apparatus I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

[Embodiment 9]

Figure 17:
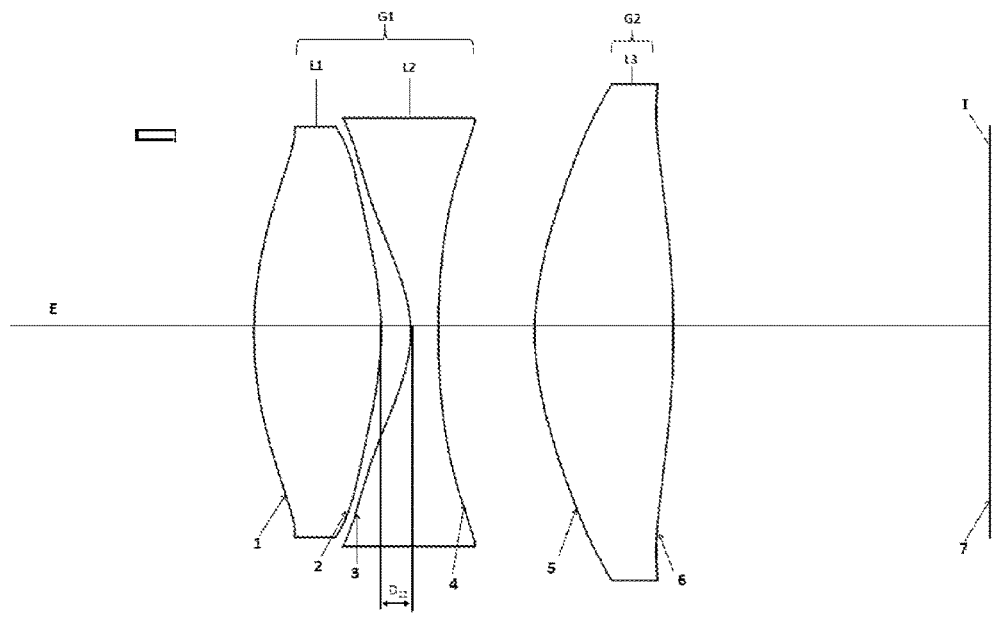
FIG. 17 is a schematic diagram showing the optical path of the eyepiece optical system (three lenses) according to a ninth embodiment of the present application.

The optical path of the eyepiece optical system is as shown in FIG. 17, and the design data of the eyepiece optical system according to the ninth embodiment is shown in table 9.

TABLE 9

Embodiment 9: effective focal length: 19.9 mm, field-of-view angle: 2ω = 48°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 17.33 | 5.5 | 1.772 | 50.0 | 20 | −3.23 |
| 2 | −13.00 | 1.3 | | | 20 | −0.44 |
| 3 | −5.50 | 1.2 | 1.722 | 29.2 | 20 | −3.16 |
| 4 | 34.45 | 4.2 | | | 20 | 7.52 |
| 5 | 12.00 | 6.0 | 1.772 | 50.0 | 22 | −7.36 |
| 6 | −36.52 | 13.7 | | | 22 | 2.74 |
| 7 Display apparatus | Infinite | | | | | |

After measurement, the lights of different field-of-views in the present embodiment have dispersion spots of small and uniform radii on the image plane (display apparatus I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

[Embodiment 10]

Figure 18:
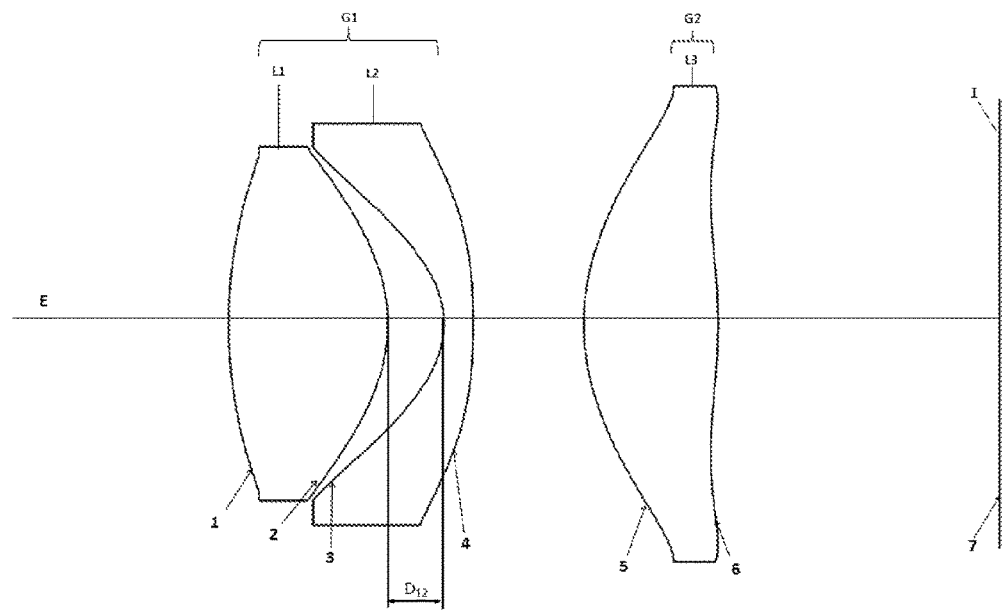
FIG. 18 is a schematic diagram showing the optical path of the eyepiece optical system (three lenses) according to a tenth embodiment of the present application.

The optical path of the eyepiece optical system is as shown in FIG. 18, and the design data of the eyepiece optical system according to the tenth embodiment is shown in table 10.

TABLE 10

Embodiment 10: effective focal length: 20.1 mm, field-of-view angle: 2ω = 48°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 19.65 | 6.5 | 1.492 | 57.3 | 17 | −12.06 |
| 2 | −6.74 | 2.3 | | | 17 | −0.51 |
| 3 | −3.65 | 1.2 | 1.582 | 30.2 | 19 | −1.13 |
| 4 | −21.93 | 4.5 | | | 19 | 3.74 |
| 5 | 9.30 | 5.5 | 1.492 | 57.3 | 22 | −1.79 |
| 6 | −21.01 | 11.5 | | | 22 | −33.34 |
| 7 Display apparatus | Infinite | | | | | |

After measurement, the lights of different field-of-views in the present embodiment have dispersion spots of small and uniform radii on the image plane (display apparatus I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

Each data in embodiments 1-10 satisfies the data requirement recorded in the summary of the present application, and the results are listed in table 11.

TABLE 11

| | $f_1/f_w$ | $f_2/f_w$ | $D_{12}/f_w$ | $(R_{21} + R_{22})/(R_{21} - R_{22})$ |
|---|---|---|---|---|
| Embodiment 1 | −1.80 | 0.52 | 0.11 | −0.93 |
| Embodiment 2 | −0.63 | 0.38 | 0.14 | −0.88 |
| Embodiment 3 | −1.44 | 0.46 | 0.30 | −1.31 |
| Embodiment 4 | −1.87 | 0.52 | 0.31 | −2.24 |
| Embodiment 5 | −3.94 | 0.58 | 0.10 | −0.45 |
| Embodiment 6 | −1.72 | 0.57 | 0.15 | −1.12 |
| Embodiment 7 | −0.80 | 0.44 | 0.07 | −0.67 |
| Embodiment 8 | −0.61 | 0.35 | 0.17 | −0.93 |
| Embodiment 9 | −3.02 | 0.62 | 0.06 | −0.73 |
| Embodiment 10 | −50.99 | 0.69 | 0.11 | −1.40 |

[Embodiment 11]

Figure 20:
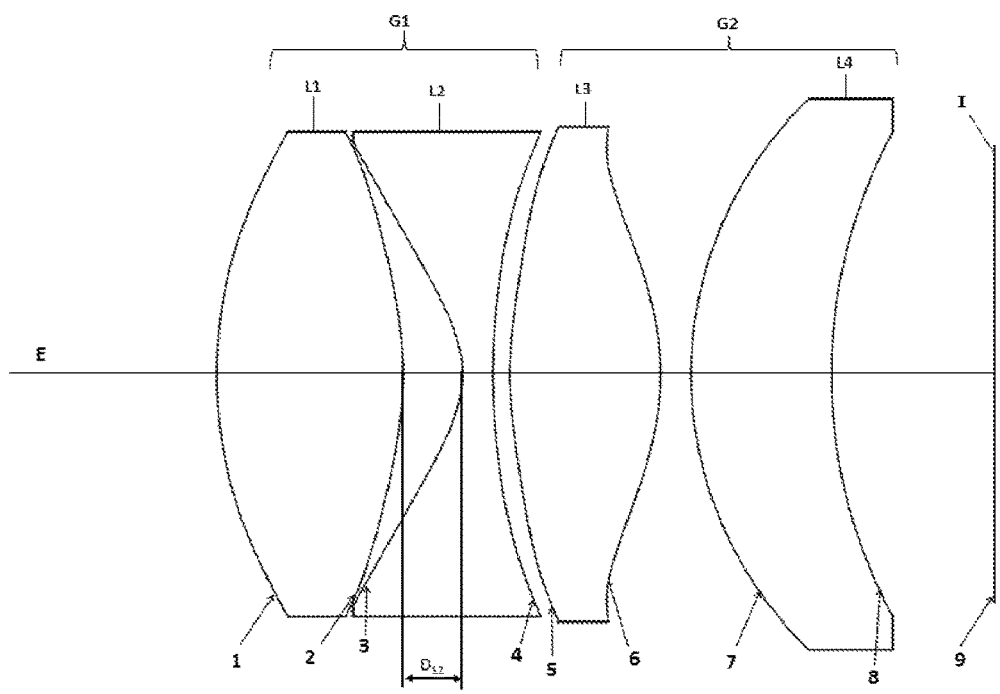
FIG. 20 is a schematic diagram showing the optical path of the eyepiece optical system (four lenses) according to an eleventh embodiment of the present application.

As shown in FIG. 20, in the schematic diagram showing the optical path of the eyepiece optical system according to an eleventh embodiment of the present application, the diaphragm E, the first lens group G1, the second lens group G2, and the display apparatus I are arranged successively from the eye viewing side to the display apparatus I side (from left to right). The first lens group G1 consists of the first lens L1 and the second lens L2, and the second lens group G2 consists of the third lens L3 and the fourth lens L4. In the present embodiment, the diaphragm E can be the exit pupil of imaging for the eyepiece optical system. It is a virtual aperture. The best imaging effect can be observed when the pupil of the human eye is positioned at the diaphragm location. In the present embodiment, the first lens L1 is a positive lens, the second lens L2 is a negative lens, which two lenses form the first lens group G1 having a negative focal power. The first lens L1 has a biconvex face shape, the optical surface of the second lens L2 towards the eye viewing side is concave to the eye viewing side. Furthermore, the first lens L1 and the second lens L2 both have even aspheric face shapes, such that the aberration residua of the system, such as the distortion, field curvature and chromatism, can be corrected completely. In the present embodiment, the third lens L3 is a biconvex positive lens having an even aspheric face shape, and can be used for providing enough positive focal power to achieve a large view angle, meanwhile the fourth lens L4 is a meniscus spherical mirror of glass material having a positive effective focal length. In additional, both optical surfaces of the fourth lens L4 are concave to the display apparatus I side. Through adding the fourth lens L4, the present embodiment has more completely corrected the system aberrations, such as field curvature and so on, improved the system telecentric degrees, and reduced the sensitivity of the optical system assembly while maintaining high image quality at the same time, thus further improving the effective system view angle. In this case, the optical surface closer to the diaphragm E side has a serial number of 1, and so on (from left to right). And the surface of the display apparatus I has a serial number of 9.

The design data of the eyepiece optical system according to the eleventh embodiment is shown in table 12.

TABLE 12

Embodiment 12: effective focal length: 17.4 mm, field-of-view angle: 2ω = 54

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 17.30 | 7.3 | 1.743 | 49.3 | 20 | 0.43 |
| 2 | −14.32 | 2.3 | | | 20 | −0.82 |
| 3 | −4.22 | 1.2 | 1.689 | 31.1 | 20 | −2.82 |
| 4 | 24.66 | 0.7 | | | 20 | 1.87 |
| 5 | 13.36 | 5.9 | 1.694 | 53.2 | 20 | −26.82 |
| 6 | −10.47 | 1.2 | | | 20 | −3.41 |
| 7 | 14.90 | 5.5 | 1.623 | 58.1 | 22 | |
| 8 | 20.00 | 6.4 | | | 20 | |
| 9 Display apparatus | Infinite | | | | | |

Figure 21:
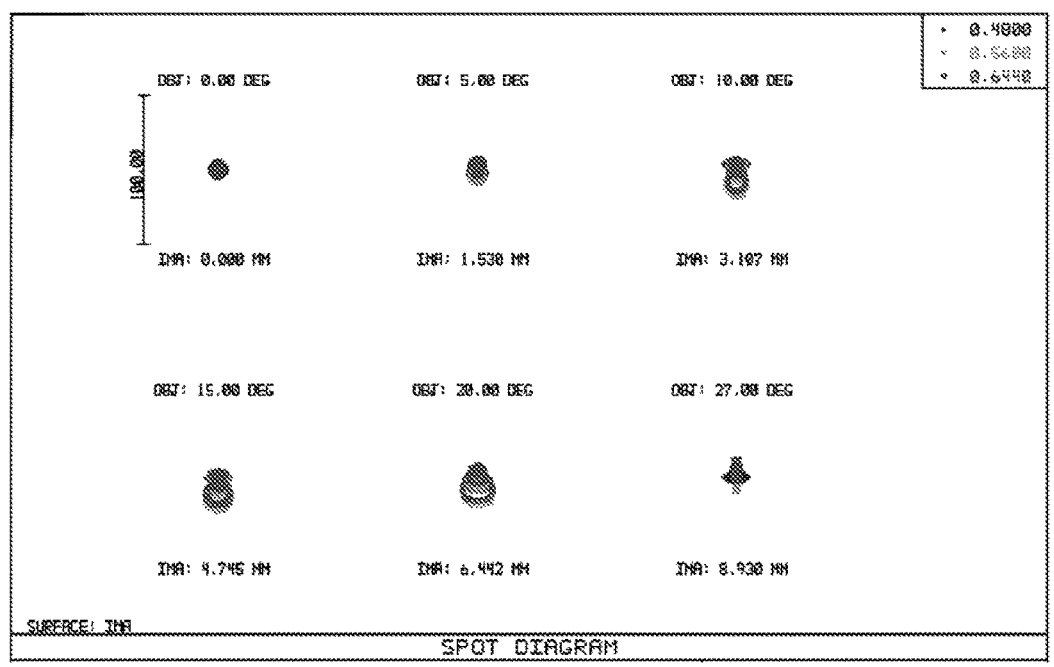
FIG. 21 is a spot diagram of the eyepiece optical system (four lenses) according to the eleventh embodiment of the present application.

FIG. 21 has shown the spot diagram of the eyepiece optical system according to the eleventh embodiment of the present application. The spot diagram reflecting the geometric structure of the optical imaging system, can be represented by dispersion spots formed by the section of the specified wavelength light focused on the image plane in the specified field, while ignoring the diffraction effect, and meanwhile, it can comprise multiple field-of-views and lights of multiple wavelengths. Therefore, the imaging quality of the optical system can be evaluated intuitively through the intensive degree, the shape and size of the dispersion spots in the spot diagram, while the chromatism of the optical system can also be evaluated intuitively through the misalignment degree of the dispersion spots with different wavelengths in the spot diagram. The smaller the RMS radius (root-mean-square radius) of the spot diagram, the higher the imaging quality of the optical system. As shown in FIG. 21 of the spot diagram according to the eleventh embodiment of the present application, the lights of different field-of-views in the present embodiment have dispersion spots of small and uniform radii on the image plane (display apparatus I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

Figure 22A:
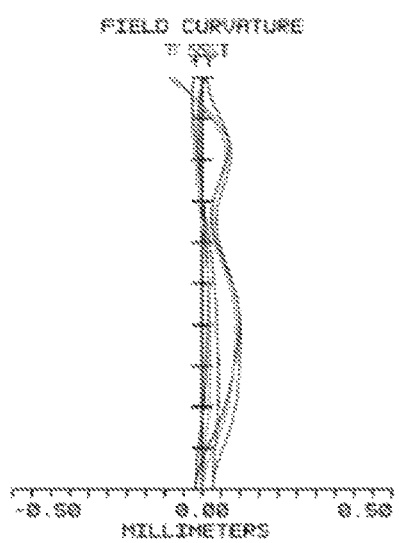
FIG. 22 (a) is a field curve diagram of the eyepiece optical system (four lenses) according to the eleventh embodiment of the present application.
Figure 22B:
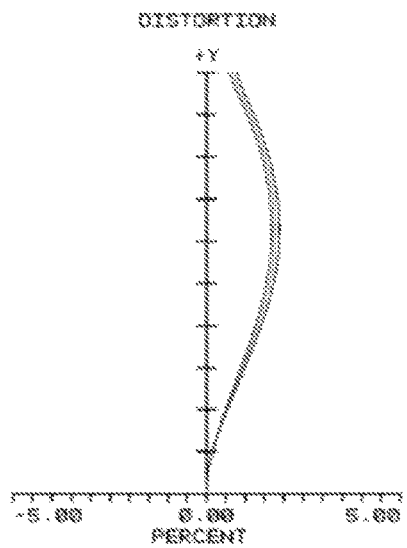

FIG. 22 (a) and FIG. 22 (b) have respectively shown the field curvature and distortion curve of the eyepiece optical system according to the eleventh embodiment of the present application, by which the characteristics of the present optical system such as super large field-of-view and high imaging quality and so on, have been represented.

[Embodiment 12]

Figure 23:
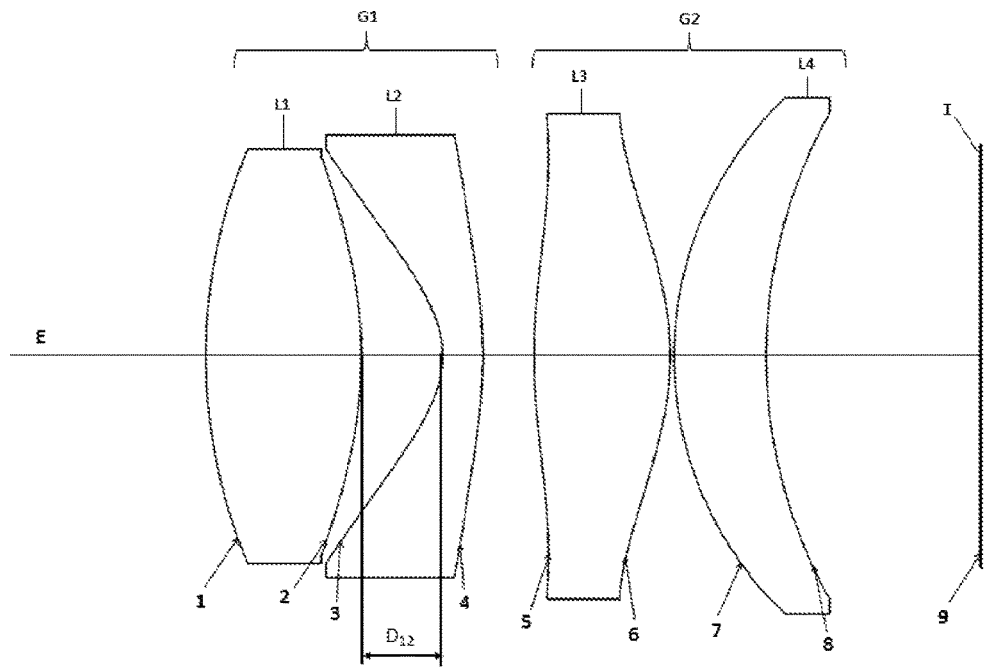
FIG. 23 is a schematic diagram showing the optical path of the eyepiece optical system (four lenses) according to a twelfth embodiment of the present application.

As shown in FIG. 23, in the schematic diagram showing the optical path of the eyepiece optical system according to a twelfth embodiment of the present application, the diaphragm E, the first lens group G1, the second lens group G2, and the display apparatus I are arranged successively from the eye viewing side to the display apparatus I side (from left to right). The first lens group G1 consists of the first lens L1 and the second lens L2, and the second lens group G2 consists of the third lens L3 and the fourth lens L4. In the present embodiment, the first lens L1 is a positive lens, the second lens L2 is a negative lens, which two lenses form the first lens group G1 having a negative focal power. The first lens L1 has a biconvex face shape, the optical surface of the second lens L2 towards the eye viewing side is concave to the eye viewing side. Furthermore, the first lens L1 and the second lens L2 both have even aspheric face shapes, such that the aberration residua of the system, such as the distortion, field curvature and chromatism, can be corrected completely. In the present embodiment, the third lens L3 is a biconvex positive lens having an even aspheric face shape, and can be used for providing enough positive focal power to achieve a large view angle, meanwhile the fourth lens L4 is a meniscus spherical mirror of glass material having a positive effective focal length. In additional, both optical surfaces of the fourth lens L4 are concave to the display apparatus I side. Comparing with the eleventh embodiment of the present application, the second lens L2 and the third lens L3 are made of optical plastics materials which have greatly reduced the system weight and manufacturing costs. In this case, the optical surface closer to the diaphragm E side has a serial number of 1, and so on (from left to right). And the surface of the display apparatus I has a serial number of 9.

The design data of the eyepiece optical system according to the twelfth embodiment is shown in table 13.

TABLE 13

Embodiment 12: effective focal length: 18.7 mm, field-of-view angle: 2ω = 50°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 25.15 | 6.5 | 1.768 | 49.3 | 18 | −3.27 |
| 2 | −17.87 | 3.4 | | | 18 | 1.10 |
| 3 | −4.01 | 1.7 | 1.636 | 24.0 | 19 | −1.92 |
| 4 | −13.70 | 2.6 | | | 19 | −17.60 |
| 5 | 26.23 | 5.7 | 1.531 | 55.7 | 21 | −37.26 |
| 6 | −12.41 | 0.2 | | | 21 | −3.27 |
| 7 | 15.28 | 3.9 | 1.743 | 49.2 | 22 | |
| 8 | 20.99 | 9.2 | | | 22 | |
| 9 Display apparatus | Infinite | | | | | |

Figure 24:
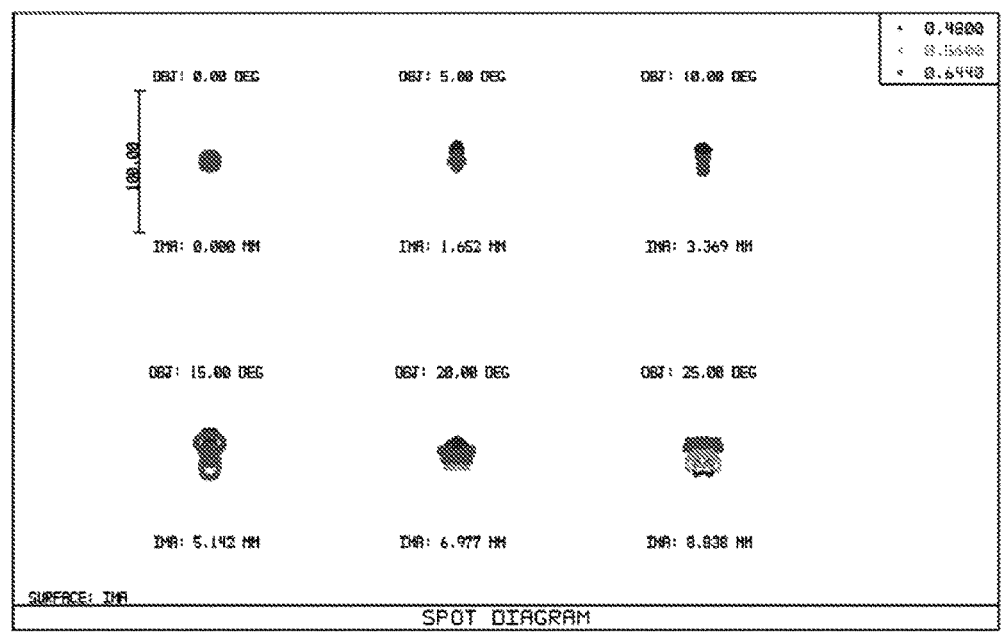
FIG. 24 is a disappoint diagram of the eyepiece optical system (four lenses) according to the twelfth embodiment of the present application.

FIG. 24 has shown the spot diagram of the eyepiece optical system according to the twelfth embodiment of the present application. As shown in the figure, the lights of different field-of-views in the present embodiment have dispersion spots of small and uniform radii on the image plane (display apparatus I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

FIG. 25 (a) and FIG. 25 (b) have respectively shown the field curvature and distortion curve of the eyepiece optical system according to the twelfth embodiment of the present application, by which the characteristics of the present optical system such as super large field-of-view and high imaging quality and so on, have been represented.

[Embodiment 13]

As shown in FIG. 26, in the schematic diagram showing the optical path of the eyepiece optical system according to a thirteenth embodiment of the present application, the diaphragm E, the first lens group G1, the second lens group G2, and the display apparatus I are arranged successively from the eye viewing side to the display apparatus I side (from left to right). The first lens group G1 consists of the first lens L1 and the second lens L2, and the second lens group G2 consists of the third lens L3 and the fourth lens L4. In the present embodiment, the first lens L1 is a positive lens, the second lens L2 is a negative lens, which two lenses form the first lens group G1 having a negative focal power. The first lens L1 has a biconvex face shape, the optical surface of the second lens L2 towards the eye viewing side is concave to the eye viewing side. Furthermore, the first lens L1 and the second lens L2 both have even aspheric face shapes, such that the aberration residua of the system, such as the distortion, field curvature and chromatism, can be corrected completely. In the present embodiment, the third lens L3 is a biconvex positive lens having an even aspheric face shape, and can be used for providing enough positive focal power to achieve a large view angle, meanwhile the fourth lens L4 is a meniscus spherical mirror of glass material having a positive effective focal length. In additional, both optical surfaces of the fourth lens L4 are concave to the display apparatus I side. Comparing with the first embodiment of the present application, the second lens L2 and the third lens L3 are made of optical plastics materials which have greatly reduced the system weight and manufacturing costs. In this case, the optical surface closer to the diaphragm E side has a serial number of 1, and so on (from left to right). And the surface of the display apparatus I has a serial number of 9.

The design data of the eyepiece optical system according to the thirteenth embodiment is shown in table 14.

TABLE 14

| Embodiment 13: effective focal length: 18.5 mm, field-of-view angle: 2ω = 50° | | | | | | |
|---|---|---|---|---|---|---|
| Serial number of Surfaces | Curvature radius (mm) | Thickness (mm) | Refractive index | Abbe number | Diameter (mm) | Aspheric coefficient |
| OBJ | Infinite | Infinite | | | | |
| 1 | 19.04 | 6.5 | 1.743 | 49.3 | 19 | 0.41 |
| 2 | −20.51 | 3.1 | | | 19 | 0.85 |
| 3 | −3.03 | 1.2 | 1.689 | 31.1 | 19 | −2.59 |

TABLE 14-continued

| Embodiment 13: effective focal length: 18.5 mm, field-of-view angle: 2ω = 50° | | | | | | |
|---|---|---|---|---|---|---|
| Serial number of Surfaces | Curvature radius (mm) | Thickness (mm) | Refractive index | Abbe number | Diameter (mm) | Aspheric coefficient |
| 4 | 46.54 | 0.1 | | | 19 | −10.78 |
| 5 | 7.56 | 5.0 | 1.694 | 53.2 | 21 | −16.66 |
| 6 | −8.91 | 0.2 | | | 21 | −4.68 |
| 7 | 15.88 | 4.5 | 1.623 | 58.1 | 22 | |
| 8 | 25.00 | 10.5 | | | 22 | |
| 9 Display apparatus | Infinite | | | | | |

Figure 27:
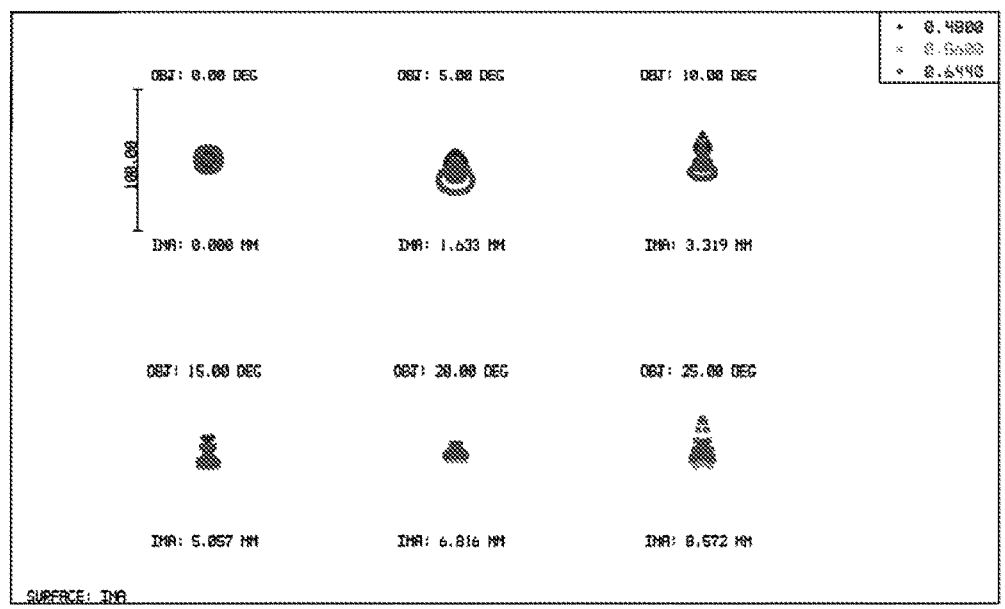
FIG. 27 is a disappoint diagram of the eyepiece optical system (four lenses) according to the thirteenth embodiment of the present application.

FIG. 27 has shown the spot diagram of the eyepiece optical system according to the thirteenth embodiment of the present application. As shown in the figure, the lights of different field-of-views in the present embodiment have dispersion spots of small and uniform radii on the image plane (display apparatus I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

Figure 28A:
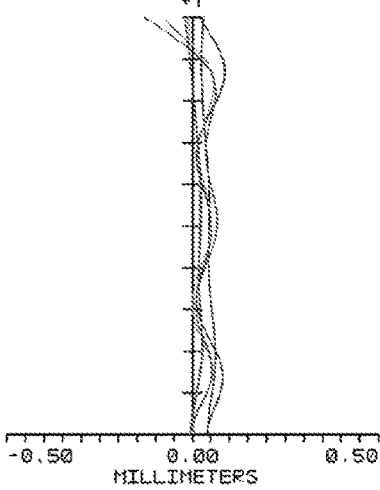
FIG. 28 (a) is a field curve diagram of the eyepiece optical system (four lenses) according to the thirteenth embodiment of the present application.
Figure 28B:
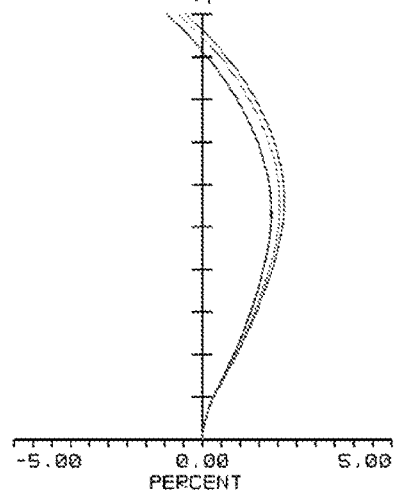

FIG. 28 (a) and FIG. 28 (b) have respectively shown the field curvature and distortion curve of the eyepiece optical system according to the thirteenth embodiment of the present application, by which the characteristics of the present optical system such as super large field-of-view and high imaging quality and so on, have been represented.

In the following embodiments 14-19, the optical path of the eyepiece optical systems are corresponding to FIG. 29-34, respectively, in which the diaphragm E, the first lens group G1, the second lens group G2, and the display apparatus I are arranged successively from the eye viewing side to the display apparatus I side (from left to right). The first lens group G1 consists of the first lens L1 and the second lens L2, and the second lens group G2 consists of the third lens L3 and the fourth lens L4. In the present embodiment, the first lens L1 is a positive lens, the second lens L2 is a negative lens, which two lenses form the first lens group G1 having a negative focal power. The first lens L1 has a biconvex face shape, the optical surface of the second lens L2 towards the eye viewing side is concave to the eye viewing side. Furthermore, the first lens L1 and the second lens L2 both have even aspheric face shapes, such that the aberration residua of the system, such as the distortion, field curvature and chromatism, can be corrected completely. In the present embodiment, the third lens L3 is a biconvex positive lens having an even aspheric face shape, and can be used for providing enough positive focal power to achieve a large view angle, meanwhile the fourth lens L4 is a meniscus spherical mirror of glass material having a positive effective focal length. In additional, both optical surfaces of the fourth lens L4 are concave to the display apparatus I side.

[Embodiment 14]

Figure 29:
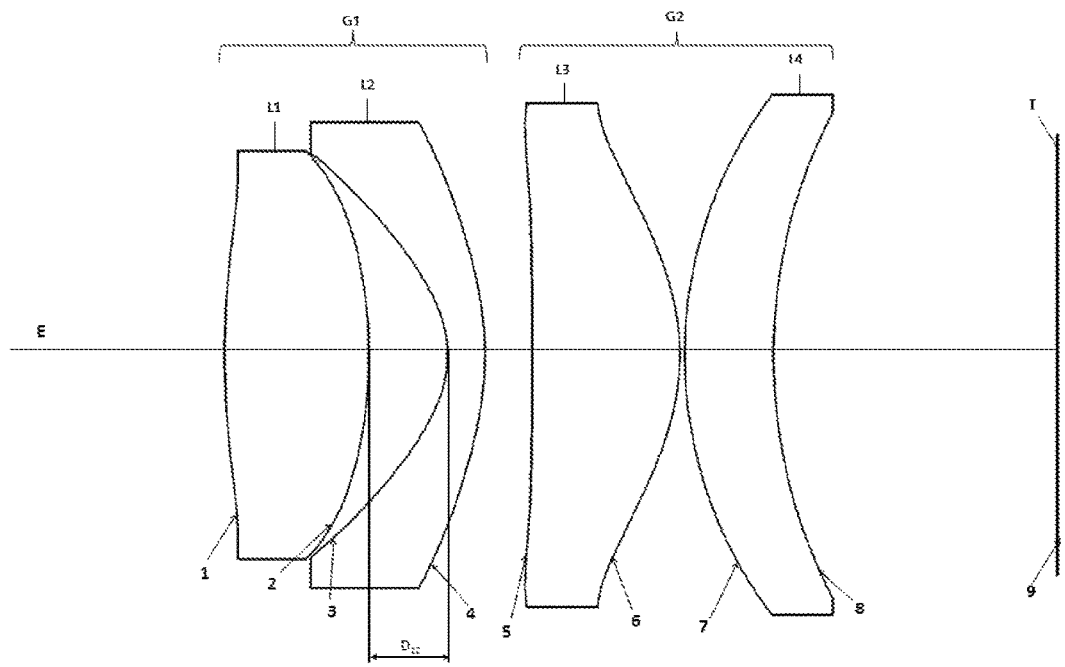
FIG. 29 is a schematic diagram showing the optical path of the eyepiece optical system (four lenses) according to a fourteenth embodiment of the present application.

The optical path of the eyepiece optical system is as shown in FIG. 29, and the design data of the eyepiece optical system according to the fourteenth embodiment is shown in table 15.

TABLE 15

Embodiment 14: effective focal length: 18.7 mm, field-of-view angle: 2ω = 50°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 32.72 | 5.77 | 1.768 | 49.3 | 18 | −8.53 |
| 2 | −19.23 | 3.15 | | | 18 | 2.07 |
| 3 | −4.60 | 1.5 | 1.636 | 24.0 | 19 | −1.41 |
| 4 | −12.29 | 1.9 | | | 19 | −6.53 |
| 5 | INF | 5.9 | 1.531 | 55.7 | 21 | −8.00 |
| 6 | −9.52 | 0.2 | | | 21 | −1.78 |
| 7 | 17.33 | 3.6 | 1.743 | 49.2 | 22 | |
| 8 | 21.00 | 11.4 | | | 22 | |
| 9 Display apparatus | Infinite | | | | | |

After measurement, the lights of different field-of-views in the present embodiment have dispersion spots of small and uniform radii on the image plane (display apparatus I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

[Embodiment 15]

Figure 30:
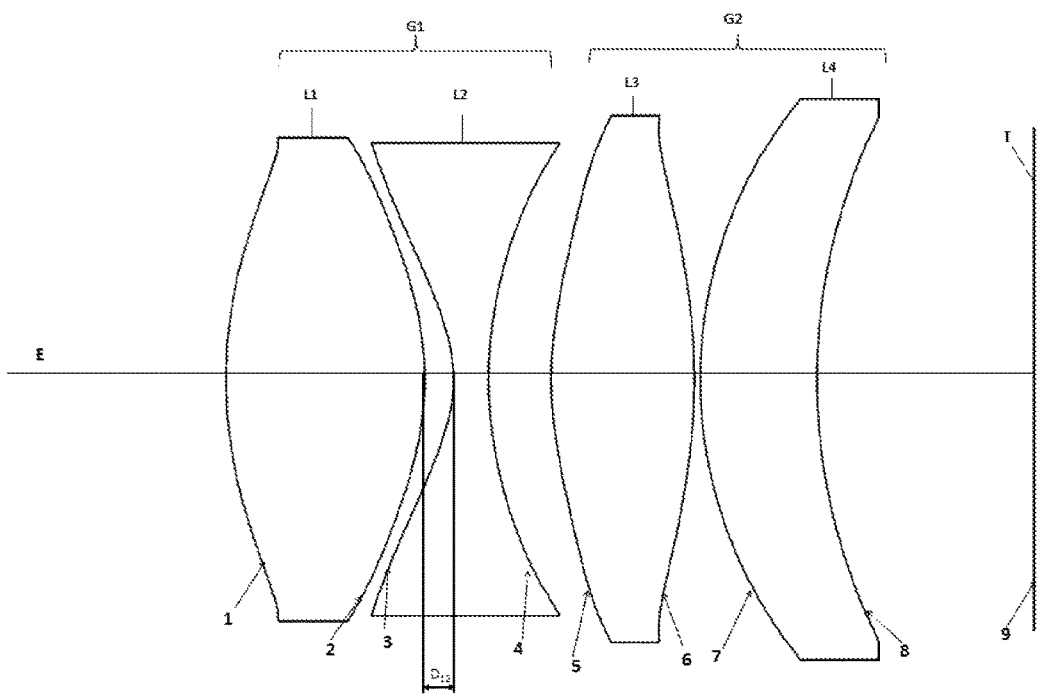
FIG. 30 is a schematic diagram showing the optical path of the eyepiece optical system (four lenses) according to a fifteenth embodiment of the present application.

The optical path of the eyepiece optical system is as shown in FIG. 30, and the design data of the eyepiece optical system according to the fifteenth embodiment is shown in table 16.

TABLE 16

Embodiment 15: effective focal length: 16.7 mm, field-of-view angle: 2ω = 52°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 14.23 | 6.8 | 1.743 | 49.3 | 18 | −1.19 |
| 2 | −10.04 | 1.0 | | | 18 | −0.92 |
| 3 | −5.17 | 1.2 | 1.689 | 31.1 | 18 | −3.47 |
| 4 | 13.71 | 2.2 | | | 18 | 0.69 |
| 5 | 12.57 | 4.9 | 1.694 | 53.2 | 20 | −5.35 |
| 6 | −18.89 | 0.2 | | | 20 | −31.94 |
| 7 | 15.06 | 4.0 | 1.623 | 58.1 | 21 | |
| 8 | 20.00 | 7.4 | | | 21 | |
| 9 Display apparatus | Infinite | | | | | |

After measurement, the lights of different field-of-views in the present embodiment have dispersion spots of small and uniform radii on the image plane (display apparatus I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

[Embodiment 16]

Figure 31:
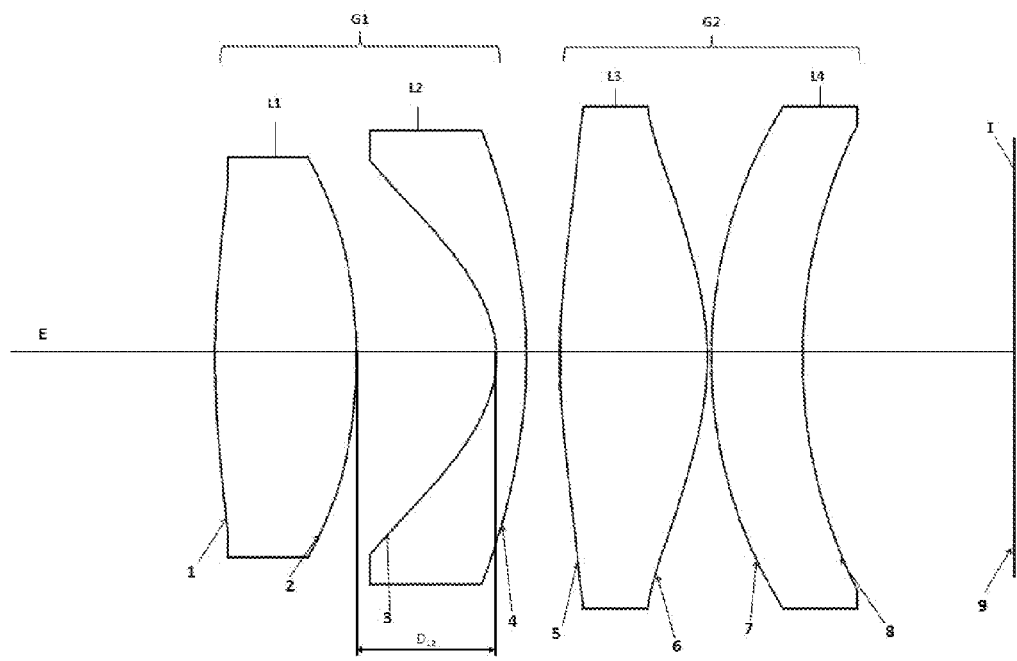
FIG. 31 is a schematic diagram showing the optical path of the eyepiece optical system (four lenses) according to a sixteenth embodiment of the present application.

The optical path of the eyepiece optical system is as shown in FIG. 31, and the design data of the eyepiece optical system according to the sixteenth embodiment is shown in table 17.

TABLE 17

Embodiment 16: effective focal length: 18.7 mm, field-of-view angle: 2ω = 50°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 35.78 | 5.7 | 1.810 | 40.9 | 18 | −60.52 |
| 2 | −21.49 | 5.6 | | | 18 | 3.01 |
| 3 | −4.57 | 1.2 | 1.650 | 21.7 | 19 | −1.32 |
| 4 | −20.51 | 1.4 | | | 19 | −5.22 |
| 5 | 30.03 | 5.9 | 1.772 | 50.0 | 21 | −30.16 |
| 6 | −12.28 | 0.2 | | | 21 | −4.30 |
| 7 | 19.05 | 3.7 | 1.743 | 49.2 | 22 | |
| 8 | 21.00 | 8.5 | | | 22 | |
| 9 Display apparatus | Infinite | | | | | |

After measurement, the lights of different field-of-views in the present embodiment have dispersion spots of small and uniform radii on the image plane (display apparatus I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

[Embodiment 17]

Figure 32:
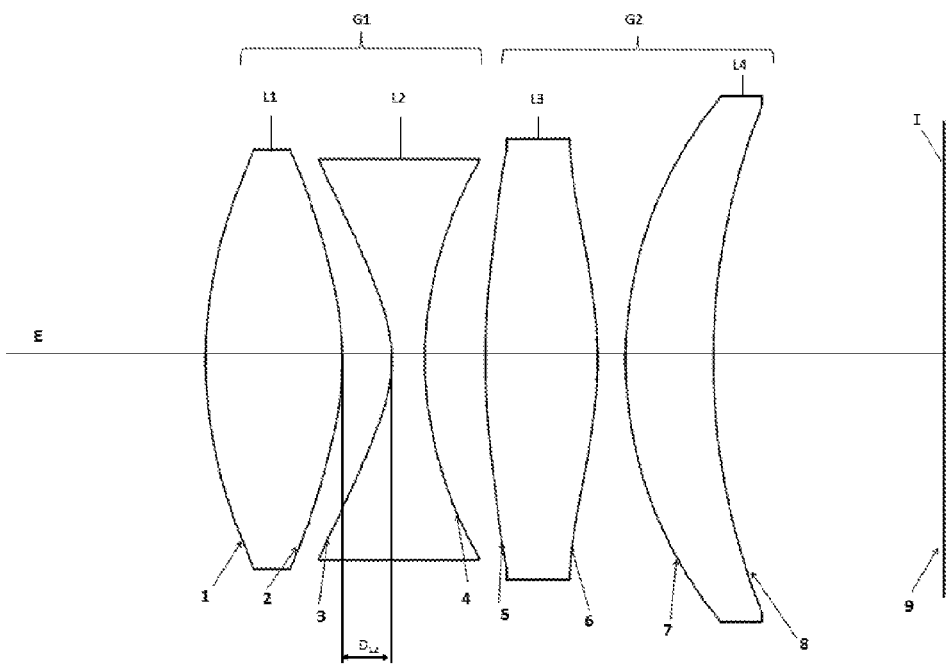
FIG. 32 is a schematic diagram showing the optical path of the eyepiece optical system (four lenses) according to a seventeenth embodiment of the present application.

The optical path of the eyepiece optical system is as shown in FIG. 32, and the design data of the eyepiece optical system according to the seventeenth embodiment is shown in table 18.

TABLE 18

Embodiment 17: effective focal length: 18.8 mm, field-of-view angle: 2ω = 50°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 16.43 | 5.0 | 1.810 | 41.0 | 18 | −9.46 |
| 2 | −11.01 | 1.8 | | | 18 | −1.54 |
| 3 | −5.08 | 1.2 | 1.636 | 24.0 | 18 | −3.36 |
| 4 | 12.90 | 2.2 | | | 18 | 1.26 |
| 5 | 27.16 | 4.1 | 1.580 | 35.2 | 18 | −5.60 |
| 6 | −14.40 | 1.0 | | | 18 | −13.28 |
| 7 | 15.02 | 3.2 | 1.786 | 44.2 | 22 | |
| 8 | 25.15 | 8.4 | | | 22 | |
| 9 Display apparatus | Infinite | | | | | |

After measurement, the lights of different field-of-views in the present embodiment have dispersion spots of small and uniform radii on the image plane (display apparatus I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

[Embodiment 18]

Figure 33:
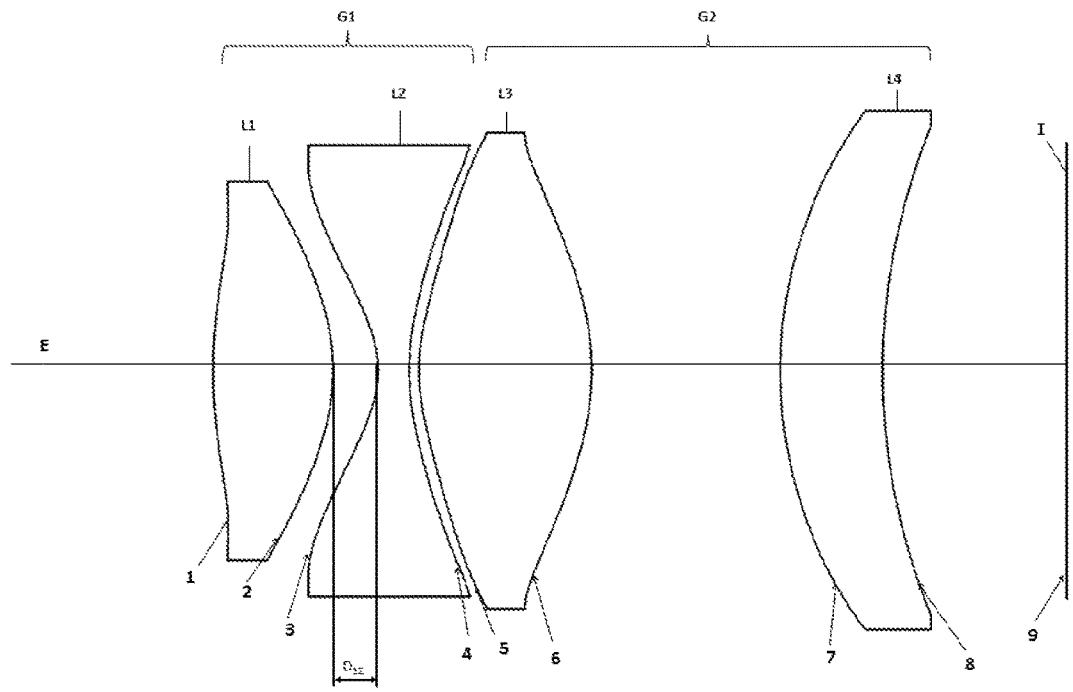
FIG. 33 is a schematic diagram showing the optical path of the eyepiece optical system (four lenses) according to an eighteenth embodiment of the present application.

The optical path of the eyepiece optical system is as shown in FIG. 33, and the design data of the eyepiece optical system according to the eighteenth embodiment is shown in table 19.

TABLE 19

Embodiment 18: effective focal length: 18.8 mm, field-of-view angle: 2ω = 50°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 18.31 | 4.7 | 1.582 | 30.2 | 17 | 4.15 |
| 2 | −8.00 | 1.7 | | | 17 | −1.54 |
| 3 | −4.06 | 1.2 | 1.722 | 29.2 | 18 | −3.30 |
| 4 | 9.43 | 0.4 | | | 18 | −8.68 |
| 5 | 7.24 | 6.7 | 1.696 | 59.1 | 20 | −10.05 |
| 6 | −10.20 | 7.3 | | | 20 | −3.82 |
| 7 | 17.00 | 4.0 | 1.620 | 60.3 | 22 | |
| 8 | 25.00 | 7.1 | | | 22 | |
| 9 Display apparatus | Infinite | | | | | |

After measurement, the lights of different field-of-views in the present embodiment have dispersion spots of small and uniform radii on the image plane (display apparatus I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

[Embodiment 19]

Figure 34:
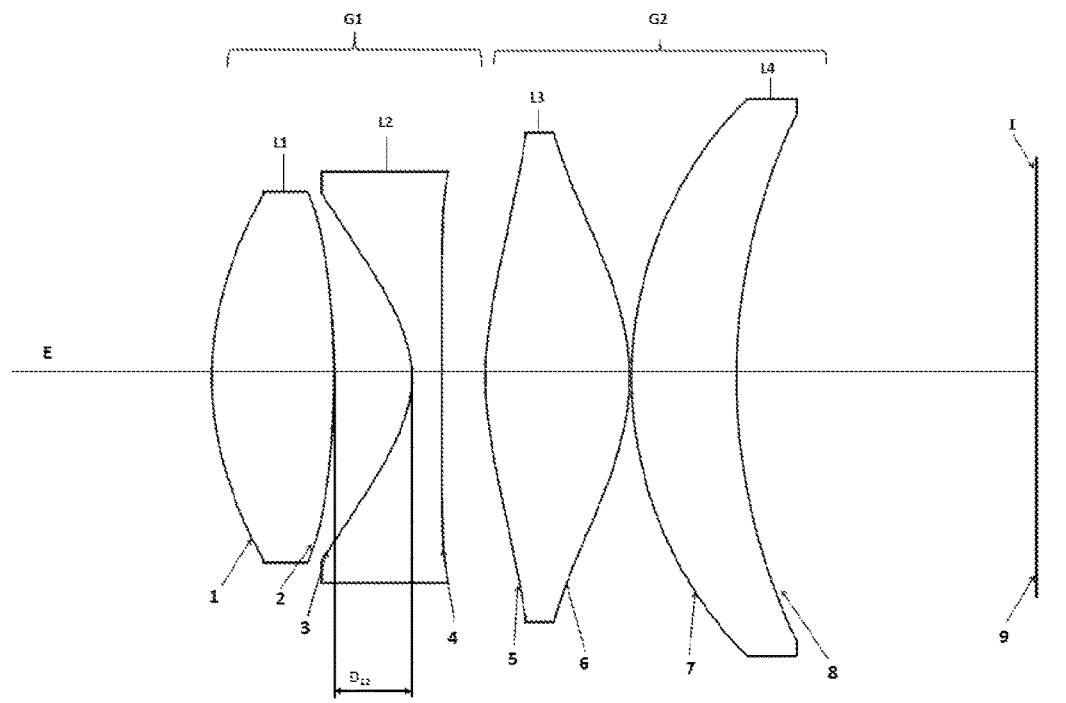
FIG. 34 is a schematic diagram showing the optical path of the eyepiece optical system (four lenses) according to a nineteenth embodiment of the present application.

The optical path of the eyepiece optical system is as shown in FIG. 34, and the design data of the eyepiece optical system according to the nineteenth embodiment is shown in table 20.

TABLE 20

Embodiment 19: effective focal length: 18.7 mm, field-of-view angle: 2ω = 50°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 12.86 | 5.0 | 1.492 | 57.3 | 18 | −2.29 |
| 2 | −34.21 | 3.2 | | | 18 | 4.26 |
| 3 | −4.75 | 1.2 | 1.582 | 30.2 | 19 | −1.86 |
| 4 | 834.45 | 1.8 | | | 19 | −8.01 |
| 5 | 13.68 | 5.9 | 1.492 | 57.3 | 20 | −11.62 |
| 6 | −9.64 | 0.1 | | | 21 | −2.60 |
| 7 | 16.2 | 4.3 | 1.744 | 44.9 | 22 | |
| 8 | 25.00 | 12.3 | | | 20 | |
| 9 Display apparatus | Infinite | | | | | |

After measurement, the lights of different field-of-views in the present embodiment have dispersion spots of small and uniform radii on the image plane (display apparatus I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

Each data in embodiments 11-19 satisfies the data requirement recorded in the summary of the present application, and the results are listed in table 21.

TABLE 21

| | $f_1/f_w$ | $f_2/f_w$ | $D_{12}/f_w$ | $f_{23}/f_2$ | $f_{24}/f_2$ | $(R_{21} + R_{22})/(R_{21} - R_{22})$ |
|---|---|---|---|---|---|---|
| Embodiment 11 | −1.70 | 0.45 | 0.13 | 1.20 | 8.47 | −0.71 |
| Embodiment 12 | −17.50 | 0.67 | 0.18 | 1.34 | 4.69 | −1.83 |
| Embodiment 13 | −0.62 | 0.31 | 0.17 | 1.15 | 10.01 | −0.88 |
| Embodiment 14 | −50.00 | 0.76 | 0.17 | 1.26 | 6.62 | −2.20 |
| Embodiment 15 | −4.14 | 0.58 | 0.06 | 1.20 | 7.75 | −0.45 |
| Embodiment 16 | −6.25 | 0.56 | 0.30 | 1.15 | 14.61 | −1.57 |
| Embodiment 17 | −50.00 | 0.63 | 0.10 | 1.41 | 3.51 | −0.43 |
| Embodiment 18 | −0.58 | 0.38 | 0.09 | 1.02 | 10.15 | −0.40 |
| Embodiment 19 | −1.45 | 0.52 | 0.17 | 1.28 | 5.23 | −0.99 |

[Embodiment 20]

Figure 36:
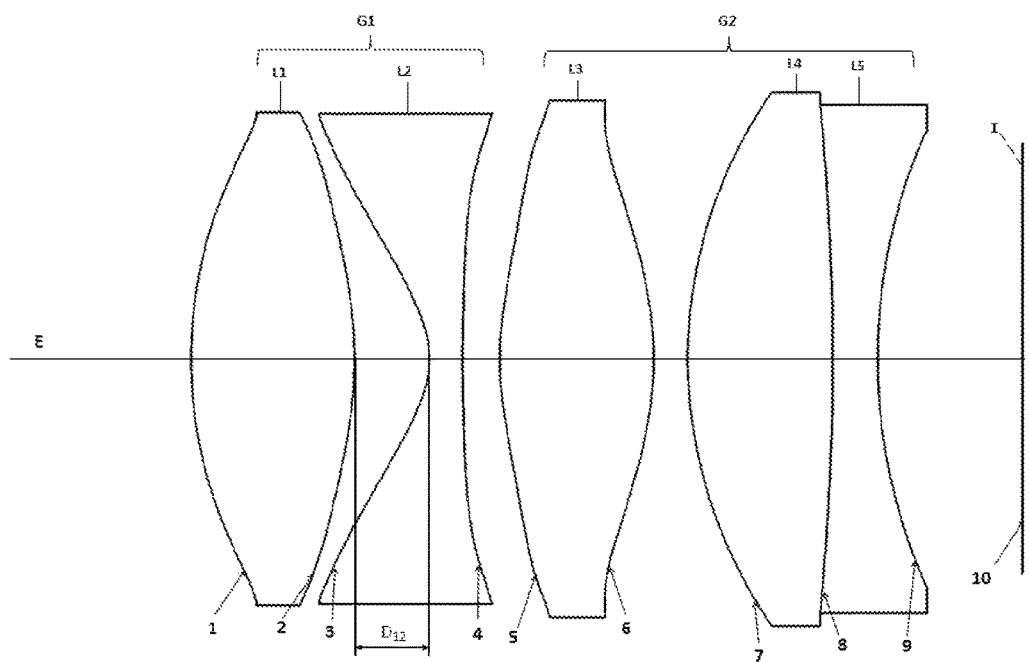
FIG. 36 is a schematic diagram showing the optical path of the eyepiece optical system (five lenses) according to a twentieth embodiment of the present application.

As shown in FIG. 36, in the schematic diagram showing the optical path of the eyepiece optical system according to a twentieth embodiment of the present application, the diaphragm E, the first lens group G1, the second lens group G2, and the display apparatus I are arranged successively from the eye viewing side to the display apparatus I side (from left to right). The first lens group G1 consists of the first lens L1 and the second lens L2, and the second lens group G2 consists of the third lens L3, the fourth lens L4 and the fifth lens L5. In the present embodiment, the diaphragm E can be the exit pupil of imaging for the eyepiece optical system. It is a virtual aperture. The best imaging effect can be observed when the pupil of the human eye is positioned at the diaphragm location. In the present embodiment, the first lens L1 is a positive lens, the second lens L2 is a negative lens, which two lenses form the first lens group G1 having a negative focal power. The first lens L1 has a biconvex face shape, the optical surface of the second lens L2 towards the eye viewing side is concave to the eye viewing side. Furthermore, the first lens L1 and the second lens L2 both have even aspheric face shapes, such that the aberration residua of the system, such as the distortion, field curvature and chromatism, can be corrected completely.

In the present embodiment, the second lens group G2 consists of the third lens L3, the fourth lens L4 and the fifth lens L5. Wherein, the fourth lens and the fifth lens form a cemented doublet lens to correct chromatic aberration completely. Furthermore, the first lens, the second lens and the third lens all have even aspheric face shapes for providing enough positive focal power to achieve a large view angle. In this case, the optical surface closer to the diaphragm E side has a serial number of 1, and so on (from left to right). And the surface of the display apparatus I has a serial number of 10.

The design data of the eyepiece optical system according to the twentieth embodiment is shown in table 22.

TABLE 22

Embodiment 20: effective focal length: 17.9 mm, field-of-view angle: 2ω = 52°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 19.37 | 6.5 | 1.734 | 51.5 | 22 | 0.78 |
| 2 | −16.18 | 2.9 | | | 22 | −0.57 |
| 3 | −4.30 | 1.3 | 1.689 | 31.2 | 22 | −2.83 |
| 4 | 98.54 | 1.5 | | | 22 | 21.52 |
| 5 | 12.07 | 6.1 | 1.697 | 55.5 | 24 | −17.47 |
| 6 | −14.75 | 1.4 | | | 24 | −4.55 |
| 7 | 20.00 | 5.8 | 1.788 | 47.5 | 24 | |
| 8 | −113.19 | 1.8 | 1.741 | 27.8 | 24 | |

TABLE 22-continued

Embodiment 20: effective focal length: 17.9 mm, field-of-view angle: 2ω = 52°

| Serial number of Surfaces | Curvature radius (mm) | Thickness (mm) | Refractive index | Abbe number | Diameter (mm) | Aspheric coefficient |
|---|---|---|---|---|---|---|
| 9 | 24.00 | 5.7 | | | 24 | |
| 10 Display apparatus | Infinite | | | | | |

Figure 37:
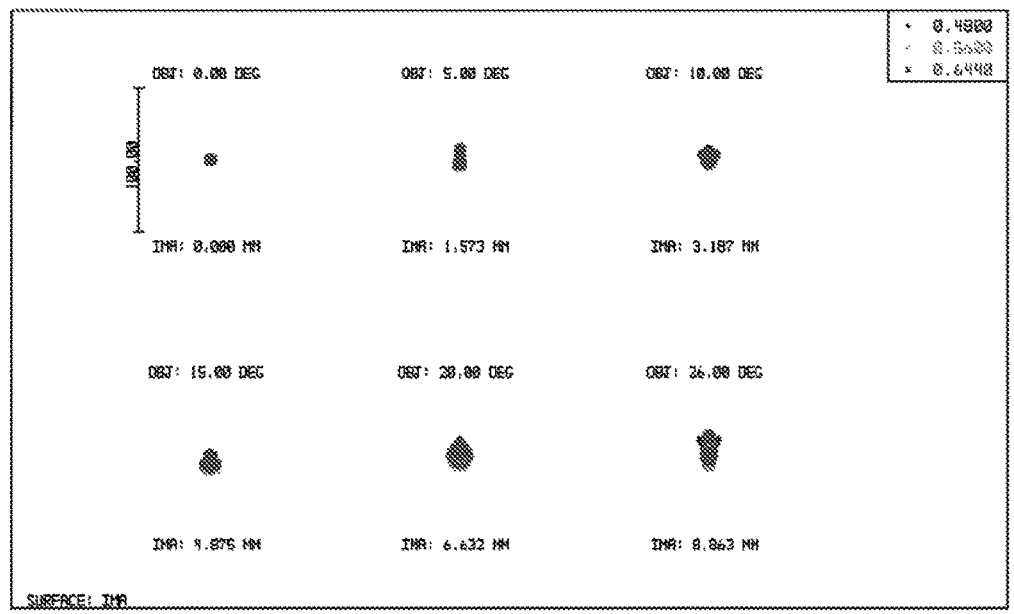
FIG. 37 is a spot diagram of the eyepiece optical system (five lenses) according to the twentieth embodiment of the present application.

FIG. 37 has shown the spot diagram of the eyepiece optical system according to the twentieth embodiment of the present application. The spot diagram reflecting the geometric structure of the optical imaging system, can be represented by dispersion spots formed by the section of the specified wavelength light focused on the image plane in the specified field, while ignoring the diffraction effect, and meanwhile, it can comprise multiple field-of-views and lights of multiple wavelengths. Therefore, the imaging quality of the optical system can be evaluated intuitively through the intensive degree, the shape and size of the dispersion spots in the spot diagram, while the chromatism of the optical system can also be evaluated intuitively through the misalignment degree of the dispersion spots with different wavelengths in the spot diagram. The smaller the RMS radius (root-mean-square radius) of the spot diagram, the higher the imaging quality of the optical system. As shown in FIG. 37 of the spot diagram according to the twentieth embodiment of the present application, the lights of different field-of-views in the present embodiment have dispersion spots of small and uniform radii on the image plane (display apparatus I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

Figures 38A, 38B:
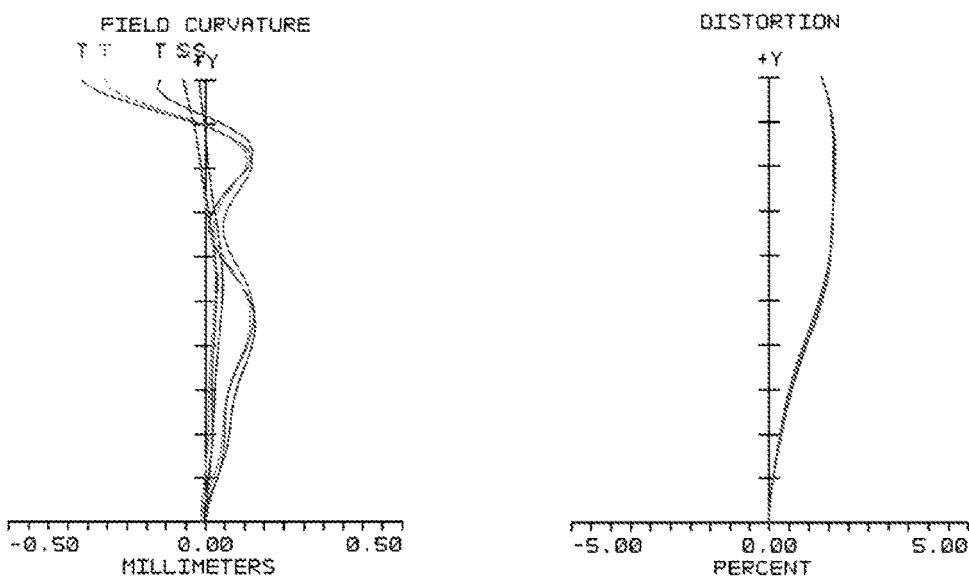
FIG. 38($a$) is a field curve diagram of the eyepiece optical system (five lenses) according to the twentieth embodiment of the present application.

FIG. 38 (a) and FIG. 38 (b) have respectively shown the field curvature and distortion curve of the eyepiece optical system according to the twentieth embodiment of the present application, by which the characteristics of the present optical system such as super large field-of-view and high imaging quality and so on, have been represented.

[Embodiment 21]

Figure 39:
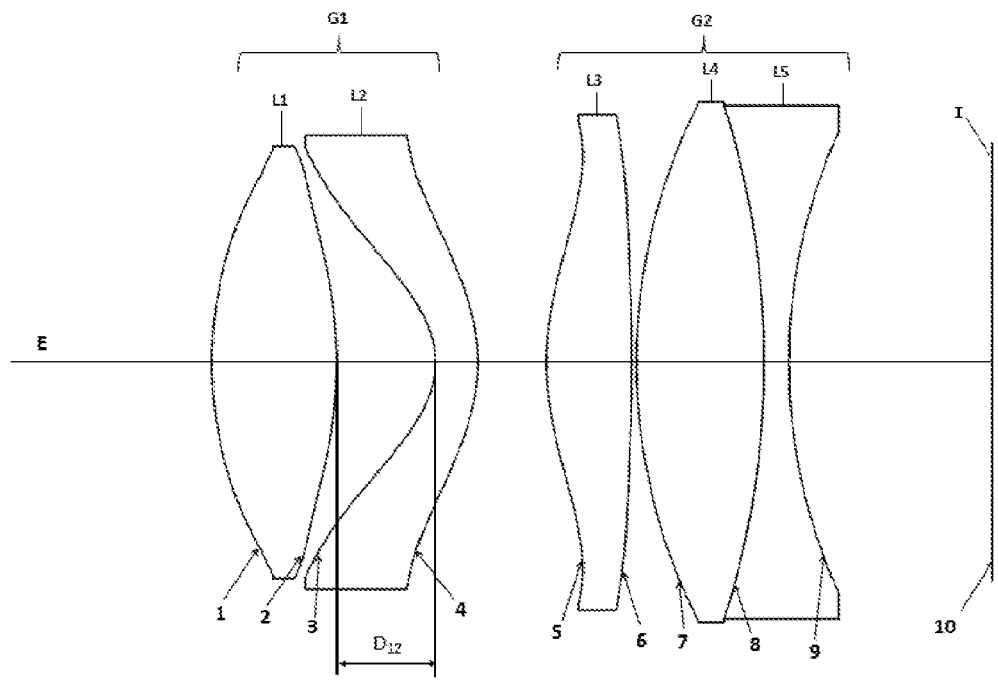
FIG. 39 is a schematic diagram showing the optical path of the eyepiece optical system (five lenses) according to a twenty-first embodiment of the present application.

As shown in FIG. 39, in the schematic diagram showing the optical path of the eyepiece optical system according to a twenty-first embodiment of the present application, the diaphragm E, the first lens group G1, the second lens group G2, and the display apparatus I are arranged successively from the eye viewing side to the display apparatus I side (from left to right). The first lens group G1 consists of the first lens L1 and the second lens L2, and the second lens group G2 consists of the third lens L3, the fourth lens L4 and the fifth lens L5. In the present embodiment, the first lens L1 is a positive lens, the second lens L2 is a negative lens, which two lenses form the first lens group G1 having a negative focal power. The first lens L1 has a biconvex face shape, the optical surface of the second lens L2 towards the eye viewing side is concave to the eye viewing side. Furthermore, the first lens L1 and the second lens L2 both have even aspheric face shapes, such that the aberration residual of the system, such as the distortion, field curvature and chromatism, can be corrected completely.

In the present embodiment, the second lens group G2 consists of the third lens L3, the fourth lens L4 and the fifth lens L5. Wherein, the fourth lens and the fifth lens form a cemented doublet lens to correct chromatic aberration completely. Furthermore, the first lens, the second lens and the third lens all have even aspheric face shapes for providing enough positive focal power to achieve a large view angle.

According to the present embodiment, the first lens L1, the second lens L2 and the third lens L3 are made of optical plastics materials which have greatly reduced the system weight and manufacturing costs. In this case, the optical surface closer to the diaphragm E side has a serial number of 1, and so on (from left to right). And the surface of the display apparatus I has a serial number of 10.

The design data of the eyepiece optical system according to the twenty-first embodiment is shown in table 23.

TABLE 23

Embodiment 21: effective focal length: 18.7 mm, field-of-view angle: 2ω = 50°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 16.00 | 5.1 | 1.531 | 55.7 | 18 | −15.17 |
| 2 | −20.84 | 4.0 | | | 18 | 0.65 |
| 3 | −3.47 | 1.7 | 1.636 | 24.0 | 19 | −1.39 |
| 4 | −7.34 | 2.8 | | | 20 | −3.48 |
| 5 | 11.05 | 3.5 | 1.531 | 55.7 | 21 | −6.64 |
| 6 | −64.02 | 0.19 | | | 21 | −68.21 |
| 7 | 23.30 | 5.2 | 1.881 | 41.0 | 22 | |
| 8 | −34.18 | 1.0 | 1.673 | 32.2 | 22 | |
| 9 | 22.75 | 8.3 | | | 22 | |
| 10 Display apparatus | Infinite | | | | | |

Figure 40:
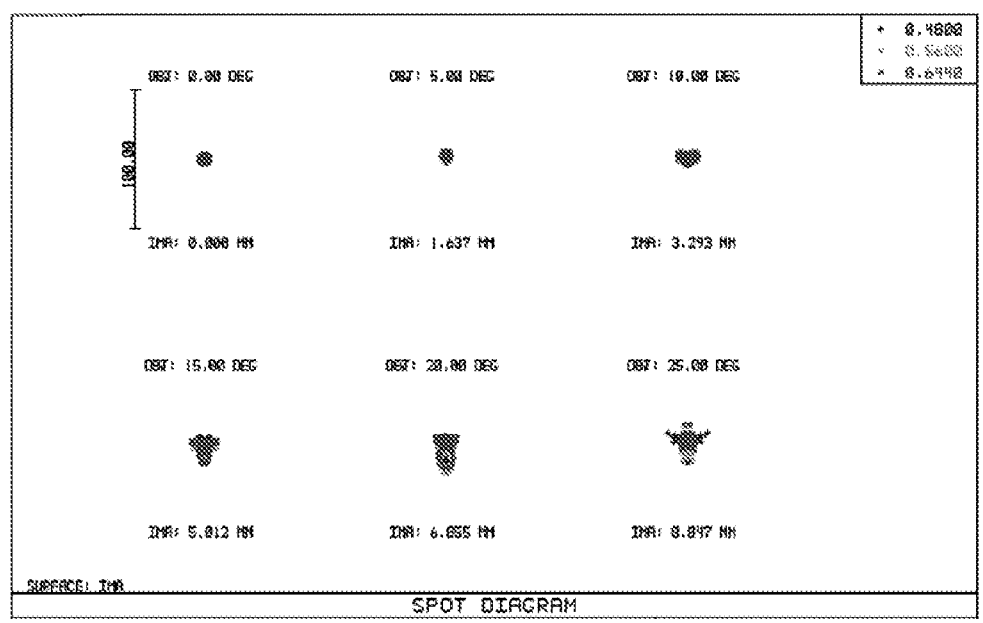
FIG. 40 is a spot diagram of the eyepiece optical system (five lenses) according to the twenty-first embodiment of the present application.

FIG. 40 has shown the spot diagram of the eyepiece optical system according to the twenty-first embodiment of the present application. As shown in figure, the lights of different field-of-views in the present embodiment have dispersion spots of small and uniform radii on the image plane (display apparatus I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

Figure 41A:
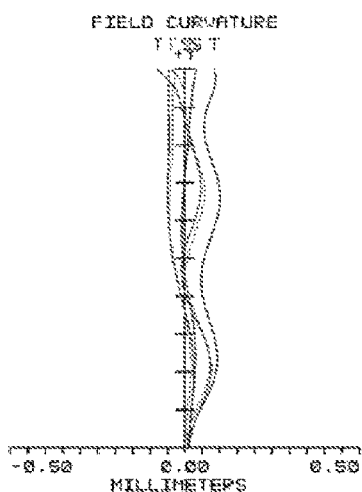
FIG. 41($a$) is a field curve diagram of the eyepiece optical system (five lenses) according to the twenty-first embodiment of the present application.
Figure 41B:
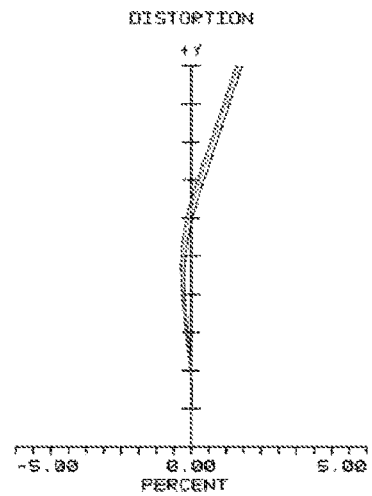

FIG. 41 (a) and FIG. 41 (b) have respectively shown the field curvature and distortion curve of the eyepiece optical system according to the twenty-first embodiment of the present application, by which the characteristics of the present optical system such as super large field-of-view and high imaging quality and so on, have been represented.

Each data in embodiments 20-21 satisfies the data requirement recorded in the summary of the present application, and the results are listed in table 24.

TABLE 24

| | $f_1/f_w$ | $f_2/f_w$ | $D_{12}/f_w$ | $f_{23}/f_2$ | $(R_{21} + R_{22})/(R_{21} - R_{22})$ |
|---|---|---|---|---|---|
| Embodiment 20 | −1.91 | 0.48 | 0.16 | 1.23 | −0.92 |
| Embodiment 21 | −20.78 | 0.71 | 0.22 | 1.36 | −2.79 |

The further measurement has proved that the eyepiece optical systems employing the parameters in the table 25 have consisted of the embodiments 22-27 of the present application. The lights of different field-of-views in these embodiments have dispersion spots of small and uniform radii on the image plane (display apparatus I), and the dispersion spots formed by focusing lights of different wavelengths at the same field-of-view have low misalignment degree, such that the aberration of these optical systems is finely corrected and display images of integral uniformity and high optical performance can be observed through these eyepiece optical systems. The specific parameters are shown in table 25.

TABLE 25

|  | $f_1/f_w$ | $f_2/f_w$ | $D_{12}/f_w$ | $f_{23}/f_2$ | $(R_{21} + R_{22})/(R_{21} - R_{22})$ |
|---|---|---|---|---|---|
| Embodiment 22 | −0.65 | 0.32 | 0.19 | 1.12 | −0.95 |
| Embodiment 23 | −51.00 | 0.78 | 0.15 | 1.29 | −2.22 |
| Embodiment 24 | −5.18 | 0.55 | 0.06 | 1.24 | −0.47 |
| Embodiment 25 | −7.21 | 0.62 | 0.30 | 1.14 | −1.52 |
| Embodiment 26 | −37.20 | 0.69 | 0.11 | 1.57 | −0.42 |
| Embodiment 27 | −0.58 | 0.36 | 0.08 | 1.03 | −0.41 |

Now the head-mounted display apparatus of the present application is further described combining the embodiments and drawing explanation.

Figure 19:
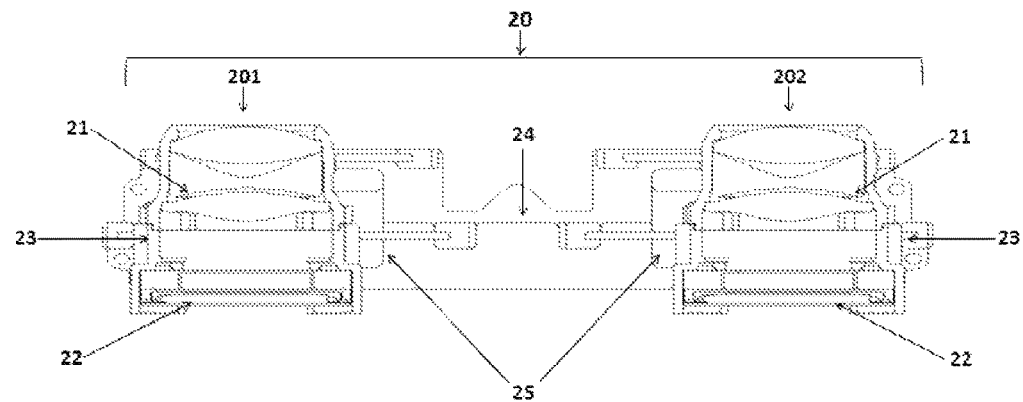
FIG. 19 is a schematic diagram showing the head-mounted display apparatus of the three-lens eyepiece optical system according to the present application.
Figure 35:
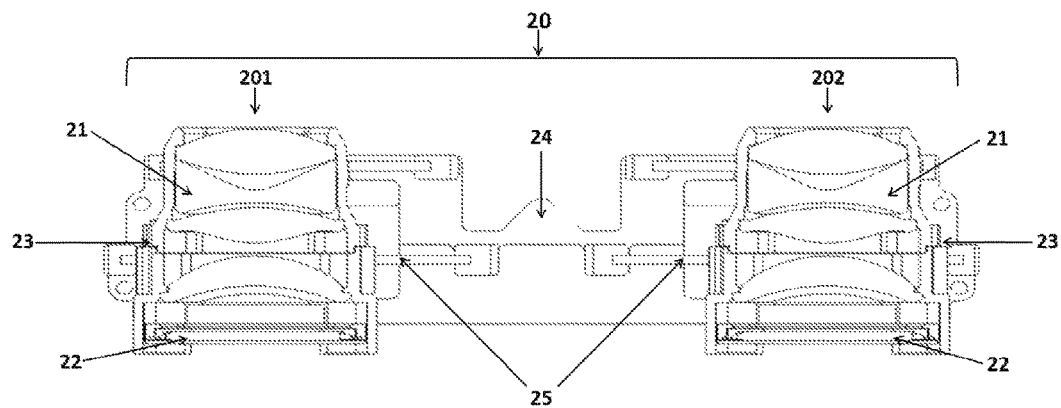
FIG. 35 is a schematic diagram showing the head-mounted display apparatus of the four-lens eyepiece optical system according to the present application.
Figure 42:
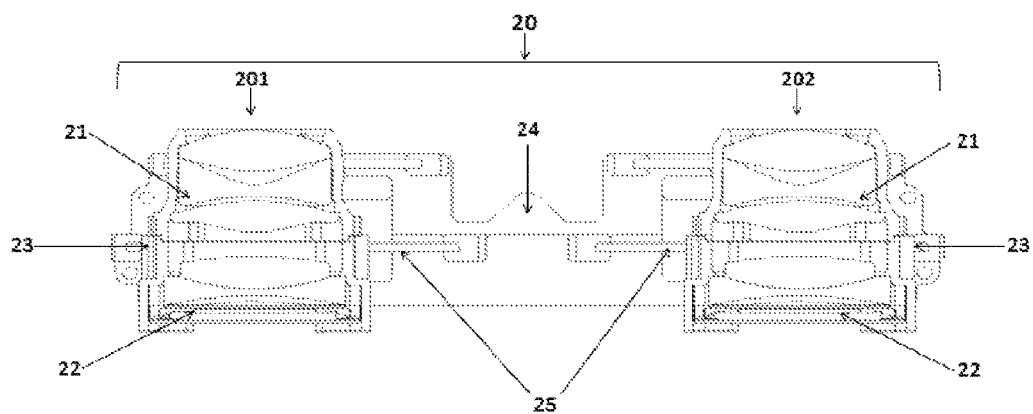
FIG. 42 is a schematic diagram showing the head-mounted display apparatus of the five-lens eyepiece optical system according to the present application.

FIGS. 19, 35 and 42 are schematic diagrams showing the binocular head-mounted display apparatus according to the present application. The binocular head-mounted display apparatus 20 comprises a miniature image display apparatus 22 and an eyepiece arranged between eyes and the miniature image display apparatus 22, wherein the eyepiece is any one of the eyepiece optical system discussed above. Specifically, the binocular head-mounted display apparatus 20 includes an eyepiece optical system 21, a miniature image display apparatus 22, an eyepiece lens tube 23, a binocular tube fixing plate 24 and an interpupillary distance adjustment mechanism 25.

The left and right observation tubes 201 and 202 respectively corresponding to the left and right eyes of the observer, are fixed on the binocular tube fixing plate 24 through the interpupillary distance adjustment mechanism 25. Inside the observation tubes, the eyepiece optical system 21 and the miniature image display apparatus 22 are respectively arranged along the optical axis from the viewing side. Meanwhile, the optical element of the eyepiece optical system 21 and the miniature image display apparatus 22 are mounted inside the eyepiece lens tube 23.

Preferably, the miniature image display apparatus 22 is an organic electroluminescent light emitting apparatus or a transmissive liquid crystal display apparatus.

Preferably, the binocular head-mounted display apparatus 20 includes two same eyepiece optical systems arranged symmetrically.

During the specific implementation, the displayed content on the miniature image display apparatus 22 is observed by the left and right eyes of the observer respectively through the eyepiece optical system 2 to generate a visual experience of clear amplification. The observer can adjust the relative distance between the left and right lens tubes through the interpupillary distance adjustment mechanism 25 to adapt the actual interpupillary distance requirement of the observer, and obtains a good binocular observation effect.

In the present application, the binocular head-mounted display apparatus 20 can carry the eyepiece optical system having technical features discussed in the claims, to obtain a head-mounted display effect of large field-of-view, high resolution, low distortion, small size and so on.

The foregoing is a further detailed description of the present application in connection with specific preferred embodiments, and cannot be considered as that the specific implementation of the present application is limited to these illustrations. It will be apparent to those skilled in the art that any various modifications or substitutions may be made to the present application without departing from the spirit of the invention, and such modifications or substitutions should be considered as falling within the scope of the present application.

What is claimed is:

1. An eyepiece optical system with a large field-of-view angle comprising a first lens group having an effective focal length of $f_1$ and a second lens group having an effective focal length of $f_2$ arranged coaxially and successively along an optical axis direction from an eye viewing side to a miniature image display apparatus side, wherein, $f_1$ is a negative value, $f_2$ is a positive value, and the eyepiece optical system has an effective focal length of $f_w$ which satisfies following relations (1) and (2):

$$-50 < f_1/f_w < -0.6 \qquad (1);$$

$$0.3 < f_2/f_w < 0.8 \qquad (2);$$

wherein, the first lens group is constituted by a first lens close to the eye viewing side and a second lens away from the eye viewing side, wherein the first lens is a biconvex positive lens and the second lens is a negative lens whose optical surface close to the eye viewing side is concave to the eye viewing side and having a negative curvature radius;

wherein, the second lens group is constituted by one or more lenses, and at least comprises a third lens adjacent to the first lens group and being a positive lens;

wherein the first lens, the second lens and the third lens have material characteristics which satisfy following relations (11), (12) and (13):

$$1.50 < Nd_{11} < 1.82 \qquad (11);$$

$$1.55 < Nd_{12} < 1.75 \qquad (12);$$

$$1.50 < Nd_{23} < 1.78 \qquad (13);$$

wherein, $Nd_{11}$, $Nd_{12}$ and $Nd_{23}$ are refractive indices of the first lens, the second lens and the third lens at d line, respectively;

wherein, the first lens, the second lens and the third lens further have material characteristics which satisfy following relations (21), (22) and (23):

$$35 < Vd_{11} < 60 \qquad (21);$$

$$21 < Vd_{12} < 35 \qquad (22);$$

$$35 < Vd_{23} < 60 \qquad (23);$$

wherein, $Vd_{11}$, $Vd_{12}$ and $Vd_{23}$ are abbe numbers of the first lens, the second lens and the third lens at d line, respectively.

2. The eyepiece optical system according to claim 1, wherein the optical surface of the second lens close to the eye viewing side is an aspheric surface, and two optical surfaces of the second lens having curvature radii satisfy following relation (3):

$$-2.2 < (R_{21} + R_{22})/(R_{21} - R_{22}) < -0.45 \qquad (3);$$

wherein, $R_{21}$ is the curvature radius of the optical surface of the second lens close to the eye viewing side, and $R_{22}$ is the curvature radius of an optical surface of the second lens close to an image source side.

3. The eyepiece optical system according to claim 2, wherein a distance between the first lens and the second lens of the first lens group satisfies following relation (4):

$$0.06 < D_{12}/f_w < 0.30 \qquad (4);$$

wherein, $D_{12}$ is the distance between an optical surface center of the first lens close to an image source side and an optical surface center of the second lens close to the eye viewing side along the optical axis direction.

4. The eyepiece optical system according to claim 1, wherein the effective focal lengths of the first lens group and the second lens group satisfy following relations (9) and (10):

$$-20.78 < f_1/f_w < -1 \qquad (9);$$

$$0.45 < f_2/f_w < 0.72 \qquad (10).$$

5. The eyepiece optical system according to claim 1, wherein the effective focal length of the first lens group $f_1$, the effective focal length of the second lens group $f_2$, and the effective focal length of the eyepiece optical system $f_w$ satisfy following relations (1b) and (2b):

$$-5 < f_1/f_w < -1 \qquad (1b);$$

$$0.35 < f_2/f_w < 0.51 \qquad (2b).$$

6. The eyepiece optical system according to claim 1, wherein the curvature radii of the second lens satisfy following relation (3a):

$$-1 < (R_{21}+R_{22})/(R_{21}-R_{22}) < -0.5 \qquad (3a);$$

wherein, $R_{21}$ is the curvature radius of the optical surface of the second lens close to the eye viewing side, and $R_{22}$ is the curvature radius of an optical surface of the second lens close to an image source side.

7. The eyepiece optical system according to claim 1, wherein a distance between the first lens and the second lens of the first lens group satisfies following relation (4a):

$$0.1 < D_{12}/f_w < 0.18 \qquad (4a);$$

wherein, $D_{12}$ is the distance between an optical surface center of the first lens close to an image source side and an optical surface center of the second lens close to the eye viewing side along the optical axis direction.

8. An eyepiece optical system with a large field-of-view angle comprising a first lens group having an effective focal length of $f_1$ and a second lens group having an effective focal length of $f_2$ arranged coaxially and successively along an optical axis direction from an eye viewing side to a miniature image display apparatus side, wherein, $f_1$ is a negative value, $f_2$ is a positive value, and the eyepiece optical system has an effective focal length of $f_w$ which satisfies following relations (1) and (2):

$$-50 < f_1/f_w < -0.6 \qquad (1);$$

$$0.3 < f_2/f_w < 0.8 \qquad (2);$$

wherein, the first lens group is constituted by a first lens close to the eye viewing side and a second lens away from the eye viewing side, wherein the first lens is a biconvex positive lens and the second lens is a negative lens whose optical surface close to the eye viewing side is concave to the eye viewing side and having a negative curvature radius;

wherein, the second lens group is constituted by one or more lenses, and at least comprises a third lens adjacent to the first lens group and being a positive lens;

wherein the first lens, the second lens and the third lens have material characteristics which satisfy following relations (11), (12) and (13):

$$1.50 < Nd_{11} < 1.82 \qquad (11);$$

$$1.55 < Nd_{12} < 1.75 \qquad (12);$$

$$1.50 < Nd_{23} < 1.78 \qquad (13);$$

wherein, $Nd_{11}$, $Nd_{12}$ and $Nd_{23}$ are refractive indices of the first lens, the second lens and the third lens at d line, respectively;

wherein, the first lens, the second lens and the third lens further have material characteristics which satisfy following relations (21), (22) and (23):

$$35 < Vd_{11} < 60 \qquad (21);$$

$$21 < Vd_{12} < 35 \qquad (22);$$

$$35 < Vd_{23} < 60 \qquad (23);$$

wherein, $Vd_{11}$, $Vd_{12}$ and $Vd_{23}$ are abbe numbers of the first lens, the second lens and the third lens at d line, respectively;

wherein, the second lens group further comprises a fourth lens located between the third lens and the miniature image display apparatus, wherein the effective focal length of the second lens group $f_2$, and an effective focal length of the third lens $f_{23}$, and an effective focal length of the fourth lens $f_{24}$ satisfy following relations (5) and (6):

$$1 \le f_{23}/f_2 \le 1.4 \qquad (5);$$

$$f_{24}/f_2 > 3.5 \qquad (6).$$

9. The eyepiece optical system according to claim 8, wherein the optical surface of the second lens close to the eye viewing side is an aspheric surface, and two optical surfaces of the second lens having curvature radii satisfy following relation (3):

$$-2.2 < (R_{21}+R_{22})/(R_{21}-R_{22}) < -0.45 \qquad (3);$$

wherein, $R_{21}$ is the curvature radius of the optical surface of the second lens close to the eye viewing side, and $R_{22}$ is the curvature radius of an optical surface of the second lens close to an image source side.

10. The eyepiece optical system according to claim 9, wherein a distance between the first lens and the second lens of the first lens group satisfies following relation (4):

$$0.06 < D_{12}/f_w < 0.30 \qquad (4);$$

wherein, $D_{12}$ is the distance between an optical surface center of the first lens close to an image source side and an optical surface center of the second lens close to the eye viewing side along the optical axis direction.

11. The eyepiece optical system according to claim 8, wherein the effective focal lengths of the first lens group and the second lens group satisfy following relations (9) and (10):

$$-20.78 < f_1/f_w < -1 \qquad (9);$$

$$0.45 < f_2/f_w < 0.72 \qquad (10).$$

12. The eyepiece optical system according to claim 8, wherein the effective focal length of the first lens group $f_1$, the effective focal length of the second lens group $f_2$, and the effective focal length of the eyepiece optical system $f_w$ satisfy following relations (1b) and (2b):

$$-5 < f_1/f_w < -1 \tag{1b}$$

$$0.35 < f_2/f_w < 0.51 \tag{2b}$$

13. The eyepiece optical system according to claim 8, wherein the curvature radii of the second lens satisfy following relation (3a):

$$-1 < (R_{21}+R_{22})/(R_{21}-R_{22}) < -0.5 \tag{3a}$$

wherein, $R_{21}$ is the curvature radius of the optical surface of the second lens close to the eye viewing side, and $R_{22}$ is the curvature radius of an optical surface of the second lens close to an image source side.

14. The eyepiece optical system according to claim 8, wherein a distance between the first lens and the second lens of the first lens group satisfies following relation (4a):

$$0.1 < D_{12}/f_w < 0.18 \tag{4a}$$

wherein, $D_{12}$ is the distance between an optical surface center of the first lens close to an image source side and an optical surface center of the second lens close to the eye viewing side along the optical axis direction.

15. An eyepiece optical system with a large field-of-view angle comprising a first lens group having an effective focal length of $f_1$ and a second lens group having an effective focal length of $f_2$ arranged coaxially and successively along an optical axis direction from an eye viewing side to a miniature image display apparatus side, wherein, $f_1$ is a negative value, $f_2$ is a positive value, and the eyepiece optical system has an effective focal length of $f_w$ which satisfies following relations (1) and (2):

$$-50 < f_1/f_w < -0.6 \tag{1}$$

$$0.3 < f_2/f_w < 0.8 \tag{2}$$

wherein, the first lens group is constituted by a first lens close to the eye viewing side and a second lens away from the eye viewing side, wherein the first lens is a biconvex positive lens and the second lens is a negative lens whose optical surface close to the eye viewing side is concave to the eye viewing side and having a negative curvature radius;

wherein, the second lens group is constituted by one or more lenses, and at least comprises a third lens adjacent to the first lens group and being a positive lens;

wherein the first lens, the second lens and the third lens have material characteristics which satisfy following relations (11), (12) and (13):

$$1.50 < Nd_{11} < 1.82 \tag{11}$$

$$1.55 < Nd_{12} < 1.75 \tag{12}$$

$$1.50 < Nd_{23} < 1.78 \tag{13}$$

wherein, $Nd_{11}$, $Nd_{12}$ and $Nd_{23}$ are refractive indices of the first lens, the second lens and the third lens at d line, respectively;

wherein, the first lens, the second lens and the third lens further have material characteristics which satisfy following relations (21), (22) and (23):

$$35 < Vd_{11} < 60 \tag{21}$$

$$21 < Vd_{12} < 35 \tag{22}$$

$$35 < Vd_{23} < 60 \tag{23}$$

wherein, $Vd_{11}$, $Vd_{12}$ and $Vd_{23}$ are abbe numbers of the first lens, the second lens and the third lens at d line, respectively;

wherein, the second lens group further comprises a fourth lens and a fifth lens, wherein the third lens, the fourth lens and the fifth lens are arranged successively from the eye viewing side to the miniature image display apparatus side, wherein the fourth lens is arranged between the third lens and the miniature image display apparatus, and meanwhile the fourth lens and the fifth lens form a cemented doublet lens, wherein the effective focal length of the second lens group $f_2$, and an effective focal length of the third lens $f_{23}$ satisfy following relation (8):

$$1 \leq f_{23}/f_2 \leq 1.6 \tag{8}$$

16. The eyepiece optical system according to claim 15, wherein the optical surface of the second lens close to the eye viewing side is an aspheric surface, and two optical surfaces of the second lens having curvature radii satisfy following relation (3):

$$-2.2 < (R_{21}+R_{22})/(R_{21}-R_{22}) < -0.45 \tag{3}$$

wherein, $R_{21}$ is the curvature radius of the optical surface of the second lens close to the eye viewing side, and $R_{22}$ is the curvature radius of an optical surface of the second lens close to an image source side.

17. The eyepiece optical system according to claim 16, wherein a distance between the first lens and the second lens of the first lens group satisfies following relation (4):

$$0.06 < D_{12}/f_w < 0.30 \tag{4}$$

wherein, $D_{12}$ is the distance between an optical surface center of the first lens close to an image source side and an optical surface center of the second lens close to the eye viewing side along the optical axis direction.

18. The eyepiece optical system according to claim 15, wherein the effective focal lengths of the first lens group and the second lens group satisfy following relations (9) and (10):

$$-20.78 < f_1/f_w < -1 \tag{9}$$

$$0.45 < f_2/f_w < 0.72 \tag{10}$$

wherein the effective focal length of the first lens group $f_1$, the effective focal length of the second lens group $f_2$, and the effective focal length of the eyepiece optical system $f_w$ satisfy following relations (1b) and (2b):

$$-5 < f_1/f_w < -1 \tag{1b}$$

$$0.35 < f_2/f_w < 0.51 \tag{2b}$$

19. The eyepiece optical system according to claim 15, wherein the curvature radii of the second lens satisfy following relation (3a):

$$-1 < (R_{21}+R_{22})/(R_{21}-R_{22}) < -0.5 \tag{3a}$$

wherein, $R_{21}$ is the curvature radius of the optical surface of the second lens close to the eye viewing side, and $R_{22}$ is the curvature radius of an optical surface of the second lens close to an image source side.

20. The eyepiece optical system according to claim 15, wherein a distance between the first lens and the second lens of the first lens group satisfies following relation (4a):

$$0.1 < D_{12}/f_w < 0.18 \tag{4a}$$

wherein, $D_{12}$ is the distance between an optical surface center of the first lens close to an image source side and an optical surface center of the second lens close to the eye viewing side along the optical axis direction.

21. A head-mounted display apparatus comprising a miniature image display apparatus and an eyepiece optical system arranged between eyes and the miniature image display apparatus, wherein, the eyepiece optical system comprises a first lens group having an effective focal length of $f_1$ and a second lens group having an effective focal length of $f_2$ arranged coaxially and successively along an optical axis direction from an eye viewing side to a miniature image display apparatus side, wherein, $f_1$ is a negative value, $f_2$ is a positive value, and the eyepiece optical system has an effective focal length of $f_w$ which satisfies following relations (1) and (2):

$$-50 < f_1/f_w < -0.6 \tag{1}$$

$$0.3 < f_2/f_w < 0.8 \tag{2}$$

wherein, the first lens group is constituted by a first lens close to the eye viewing side and a second lens away from the eye viewing side, wherein the first lens is a biconvex positive lens and the second lens is a negative lens whose optical surface close to the eye viewing side is concave to the eye viewing side and having a negative curvature radius;

wherein, the second lens group is constituted by one or more lenses, and at least comprises a third lens adjacent to the first lens group and being a positive lens;

wherein the first lens, the second lens and the third lens have material characteristics which satisfy following relations (11), (12) and (13):

$$1.50 < Nd_{11} < 1.82 \tag{11}$$

$$1.55 < Nd_{12} < 1.75 \tag{12}$$

$$1.50 < Nd_{23} < 1.78 \tag{13}$$

wherein, $Nd_{11}$, $Nd_{12}$ and $Nd_{23}$ are refractive indices of the first lens, the second lens and the third lens at d line, respectively;

wherein, the first lens, the second lens and the third lens further have material characteristics which satisfy following relations (21), (22) and (23):

$$35 < Vd_{11} < 60 \tag{21}$$

$$21 < Vd_{12} < 35 \tag{22}$$

$$35 < Vd_{23} < 60 \tag{23}$$

wherein, $Vd_{11}$, $Vd_{12}$ and $Vd_{23}$ are abbe numbers of the first lens, the second lens and the third lens at d line, respectively.

22. A head-mounted display apparatus comprising a miniature image display apparatus and an eyepiece optical system arranged between eyes and the miniature image display apparatus, wherein, the eyepiece optical system comprises a first lens group having an effective focal length of $f_1$ and a second lens group having an effective focal length of $f_2$ arranged coaxially and successively along an optical axis direction from an eye viewing side to a miniature image display apparatus side, wherein, $f_1$ is a negative value, $f_2$ is a positive value, and the eyepiece optical system has an effective focal length of $f_w$ which satisfies following relations (1) and (2):

$$-50 < f_1/f_w < -0.6 \tag{1}$$

$$0.3 < f_2/f_w < 0.8 \tag{2}$$

wherein, the first lens group is constituted by a first lens close to the eye viewing side and a second lens away from the eye viewing side, wherein the first lens is a biconvex positive lens and the second lens is a negative lens whose optical surface close to the eye viewing side is concave to the eye viewing side and having a negative curvature radius;

wherein, the second lens group is constituted by one or more lenses, and at least comprises a third lens adjacent to the first lens group and being a positive lens;

wherein the first lens, the second lens and the third lens have material characteristics which satisfy following relations (11), (12) and (13):

$$1.50 < Nd_{11} < 1.82 \tag{11}$$

$$1.55 < Nd_{12} < 1.75 \tag{12}$$

$$1.50 < Nd_{23} < 1.78 \tag{13}$$

wherein, $Nd_{11}$, $Nd_{12}$ and $Nd_{23}$ are refractive indices of the first lens, the second lens and the third lens at d line, respectively;

wherein, the first lens, the second lens and the third lens further have material characteristics which satisfy following relations (21), (22) and (23):

$$35 < Vd_{11} < 60 \tag{21}$$

$$21 < Vd_{12} < 35 \tag{22}$$

$$35 < Vd_{23} < 60 \tag{23}$$

wherein, $Vd_{11}$, $Vd_{12}$ and $Vd_{23}$ are abbe numbers of the first lens, the second lens and the third lens at d line, respectively;

wherein, the second lens group further comprises a fourth lens located between the third lens and the miniature image display apparatus, wherein the effective focal length of the second lens group $f_2$, and an effective focal length of the third lens $f_{23}$, and an effective focal length of the fourth lens $f_{24}$ satisfy following relations (5) and (6):

$$1 \le f_{23}/f_2 \le 1.4 \tag{5}$$

$$f_{24}/f_2 > 3.5 \tag{6}$$

23. A head-mounted display apparatus comprising a miniature image display apparatus and an eyepiece optical system arranged between eyes and the miniature image display apparatus, wherein, the eyepiece optical system comprises a first lens group having an effective focal length of $f_1$ and a second lens group having an effective focal length of $f_2$ arranged coaxially and successively along an optical axis direction from an eye viewing side to a miniature image display apparatus side, wherein, $f_1$ is a negative value, $f_2$ is a positive value, and the eyepiece optical system has an effective focal length of $f_w$ which satisfies following relations (1) and (2):

$$-50 < f_1/f_w < -0.6 \tag{1}$$

$$0.3 < f_2/f_w < 0.8 \tag{2}$$

wherein, the first lens group is constituted by a first lens close to the eye viewing side and a second lens away from the eye viewing side, wherein the first lens is a biconvex positive lens and the second lens is a negative lens whose optical surface close to the eye viewing side is concave to the eye viewing side and having a negative curvature radius;

wherein, the second lens group is constituted by one or more lenses, and at least comprises a third lens adjacent to the first lens group and being a positive lens;

wherein the first lens, the second lens and the third lens have material characteristics which satisfy following relations (11), (12) and (13):

$$1.50 < Nd_{11} < 1.82 \quad (11);$$

$$1.55 < Nd_{12} < 1.75 \quad (12);$$

$$1.50 < Nd_{23} < 1.78 \quad (13);$$

wherein, $Nd_{11}$, $Nd_{12}$ and $Nd_{23}$ are refractive indices of the first lens, the second lens and the third lens at d line, respectively;

wherein, the first lens, the second lens and the third lens further have material characteristics which satisfy following relations (21), (22) and (23):

$$35 < Vd_{11} < 60 \quad (21);$$

$$21 < Vd_{12} < 35 \quad (22);$$

$$35 < Vd_{23} < 60 \quad (23);$$

wherein, $Vd_{11}$, $Vd_{12}$ and $Vd_{23}$ are abbe numbers of the first lens, the second lens and the third lens at d line, respectively;

wherein, the second lens group further comprises a fourth lens and a fifth lens, wherein the third lens, the fourth lens and the fifth lens are arranged successively from the eye viewing side to the miniature image display apparatus side, wherein the fourth lens is arranged between the third lens and the miniature image display apparatus, and meanwhile the fourth lens and the fifth lens form a cemented doublet lens, wherein the effective focal length of the second lens group $f_2$, and an effective focal length of the third lens $f_{23}$ satisfy following relation (8):

$$1 \leq f_{23}/f_2 \leq 1.6 \quad (8).$$

* * * * *